United States Patent
Chien et al.

(10) Patent No.: US 11,898,660 B2
(45) Date of Patent: Feb. 13, 2024

(54) FLUORORESIN DIAPHRAGM VALVE

(71) Applicant: BUENO TECHNOLOGY CO., LTD., Tainan (TW)

(72) Inventors: Huan-Jan Chien, Tainan (TW); Po-Wen Chen, Tainan (TW)

(73) Assignee: Bueno Technology Co., Ltd., Tainan (TW)

( * ) Notice: Subject to any disclaimer, the term of this patent is extended or adjusted under 35 U.S.C. 154(b) by 221 days.

(21) Appl. No.: 17/468,978

(22) Filed: Sep. 8, 2021

(65) Prior Publication Data

US 2022/0090687 A1    Mar. 24, 2022

(30) Foreign Application Priority Data

Sep. 22, 2020  (TW) ................................. 109132798

(51) Int. Cl.
*F16K 7/16*  (2006.01)
*F16K 27/02*  (2006.01)

(52) U.S. Cl.
CPC ............ *F16K 7/16* (2013.01); *F16K 27/0236* (2013.01)

(58) Field of Classification Search
CPC ........... F16K 7/16; F16K 7/12; F16K 27/0236
See application file for complete search history.

(56) References Cited

U.S. PATENT DOCUMENTS

| | | | | |
|---|---|---|---|---|
| 2,823,696 A * | 2/1958 | Detlefson | ............. | F16K 49/005 137/340 |
| 5,730,423 A * | 3/1998 | Wu | ........................... | F16K 7/16 251/368 |
| 6,612,538 B2 * | 9/2003 | Fukano | .................... | F16K 27/02 251/63.5 |
| 7,628,376 B2 * | 12/2009 | Masamura | ................ | F16K 7/14 251/63.6 |
| 7,686,280 B2 * | 3/2010 | Lowery | ..................... | F16K 7/14 251/363 |
| 9,638,345 B2 * | 5/2017 | Okita | ......................... | F16K 7/14 |
| 10,648,587 B2 * | 5/2020 | Gashgaee | ............. | F16K 31/126 |
| 11,359,730 B2 * | 6/2022 | Nakamura | .............. | F16K 41/10 |
| 2006/0145107 A1 * | 7/2006 | Masamura | ................ | F16K 7/14 251/63.5 |

(Continued)

FOREIGN PATENT DOCUMENTS

| CN | 110878846 A | 3/2020 |
|---|---|---|
| DE | 10392895 T5 | 8/2005 |

(Continued)

*Primary Examiner* — Umashankar Venkatesan

(74) *Attorney, Agent, or Firm* — Rosenberg, Klein & Lee

(57) ABSTRACT

A fluororesin diaphragm valve includes a valve portion, a sealing mechanism and an adjusting mechanism for the opening degree of the valve. The valve portion includes a valve body, a valve shaft, and a valve upper cover. The valve body includes a square portion, an annular portion, and a valve chamber. The sealing mechanism includes a diaphragm, an upper valve body, a tightening ring and an annular portion of the valve body. The adjusting mechanism is installed on the top of the valve upper cover. The sealing mechanism is installed in the annular portion and at the minimum diameter area of the annular portion, having annular lattice-shaped ribbed plates with horizontal openings to increase the structural strength of the diaphragm seal and improve the heat dissipation effect.

12 Claims, 30 Drawing Sheets

(56) References Cited

U.S. PATENT DOCUMENTS

2023/0071787 A1* 3/2023 Oshima .............. F16K 27/0236

FOREIGN PATENT DOCUMENTS

| DE | 102016123606 A1 | 6/2018 |
| DE | 102017131101 A1 | 6/2019 |
| DE | 102019122625 A1 | 3/2020 |
| TW | 202010966 A | 3/2020 |

* cited by examiner

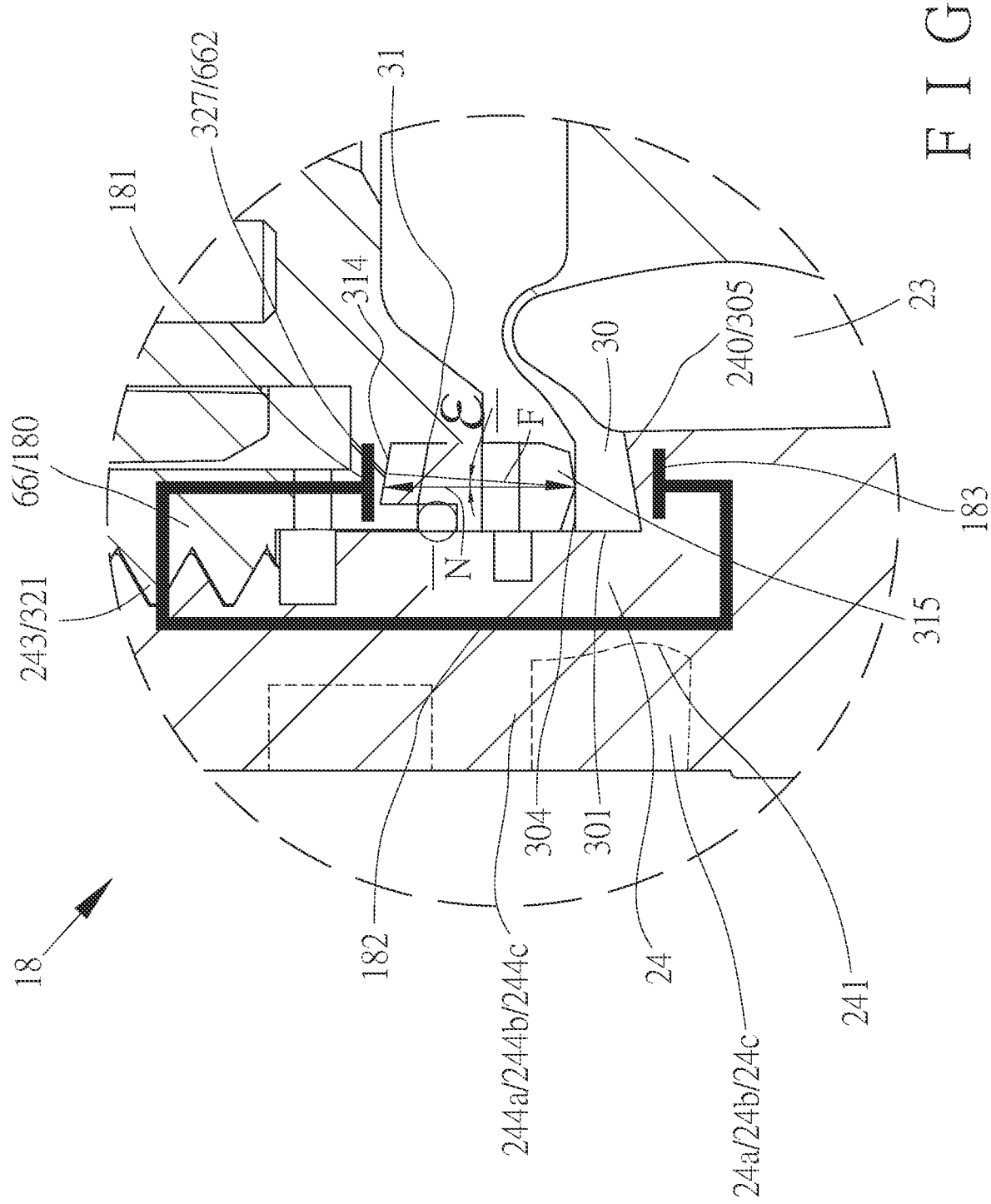

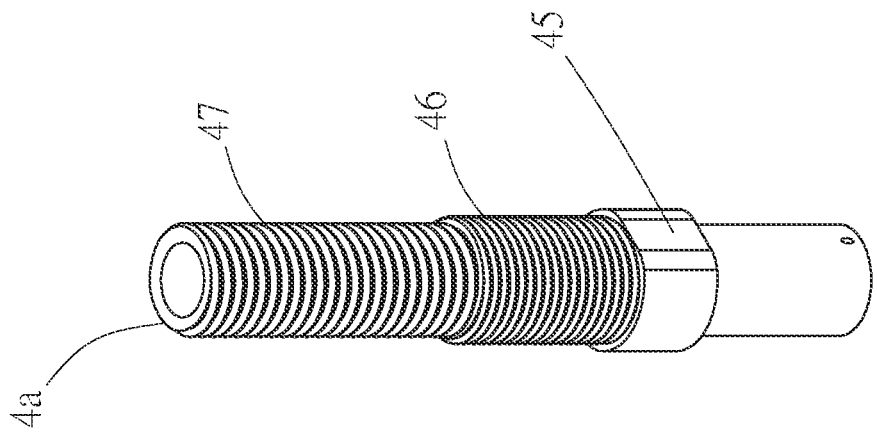
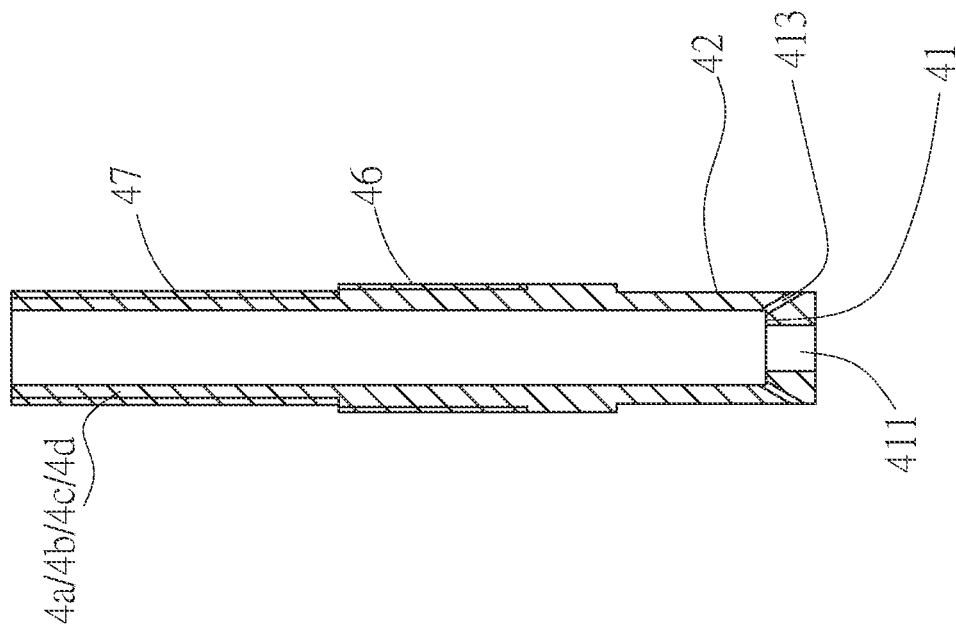

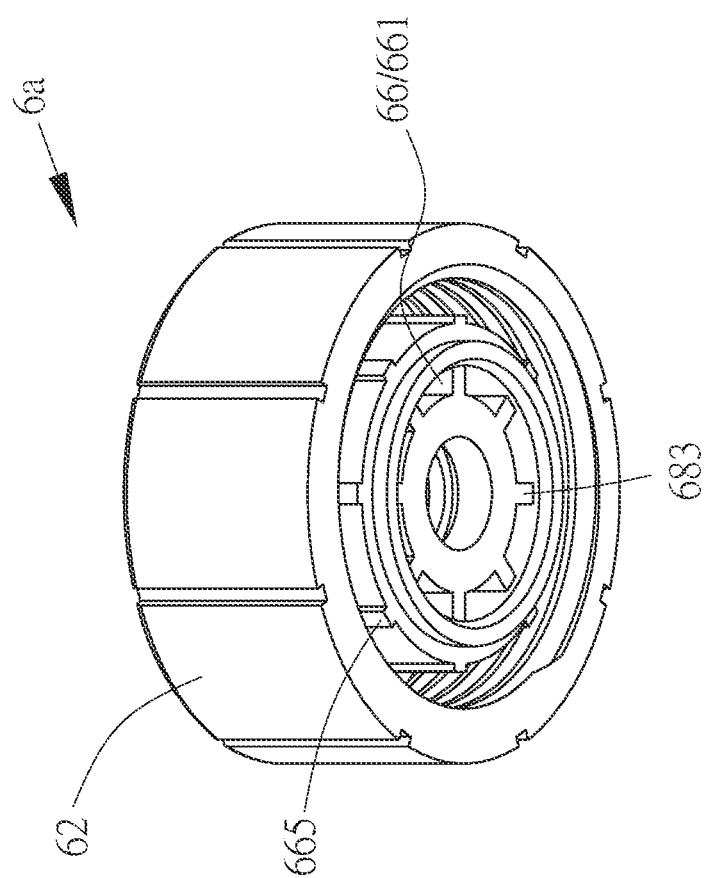
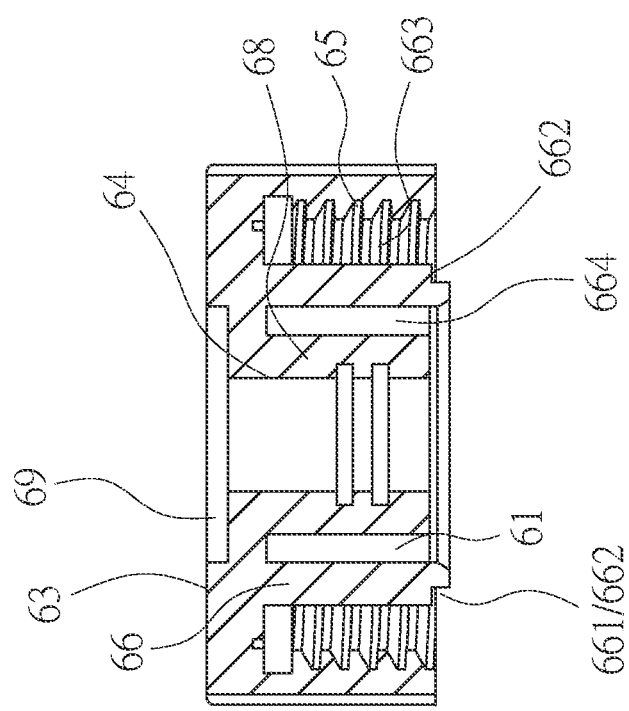
F I G . 3C

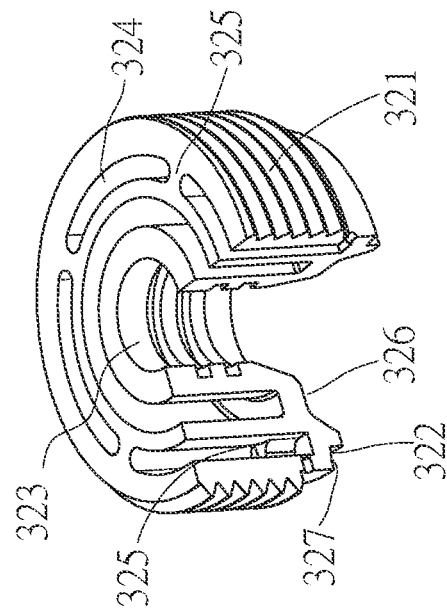
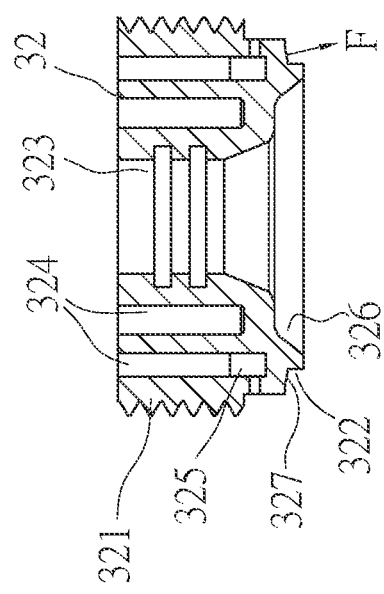
FIG. 4C'
FIG. 4C

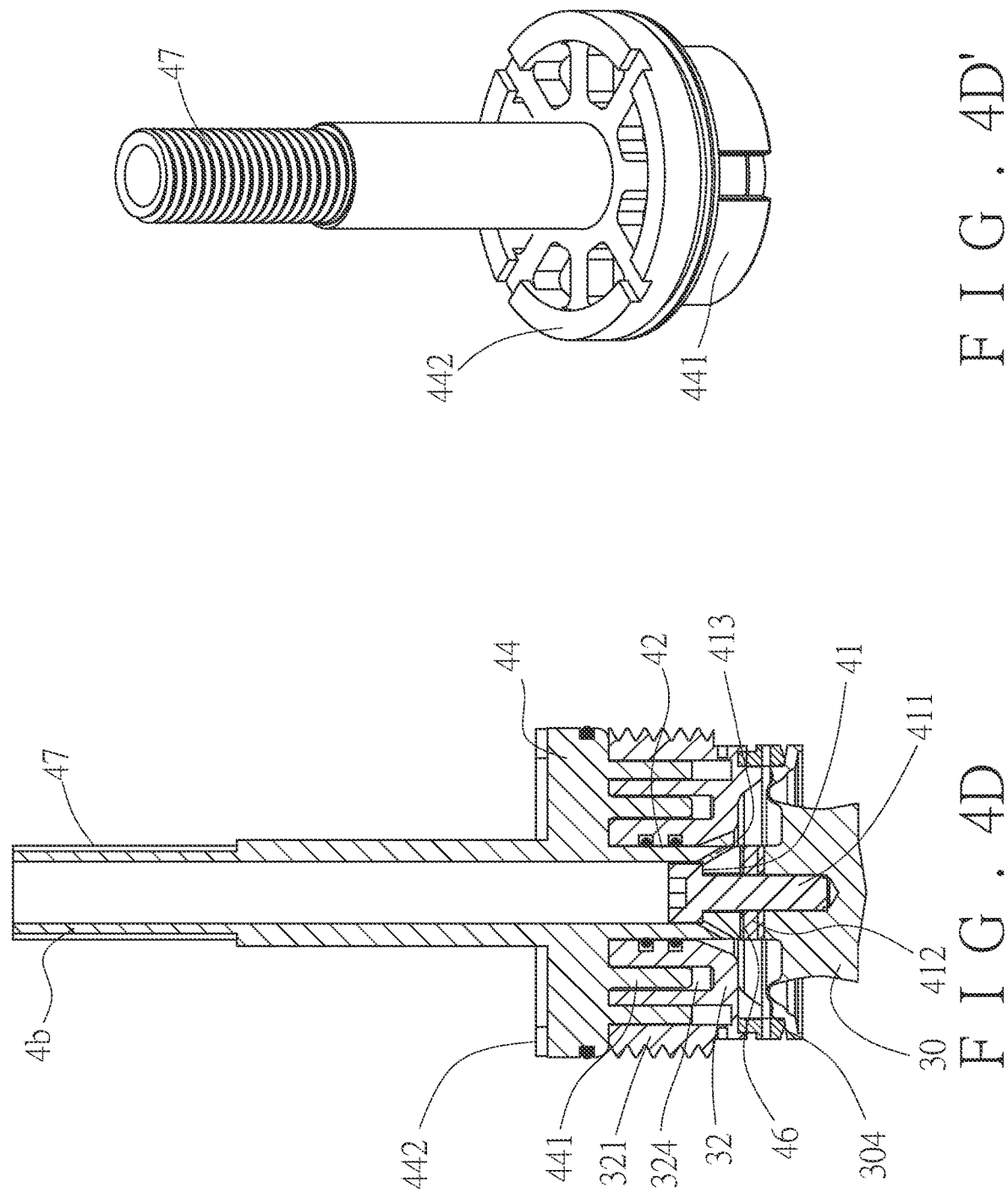

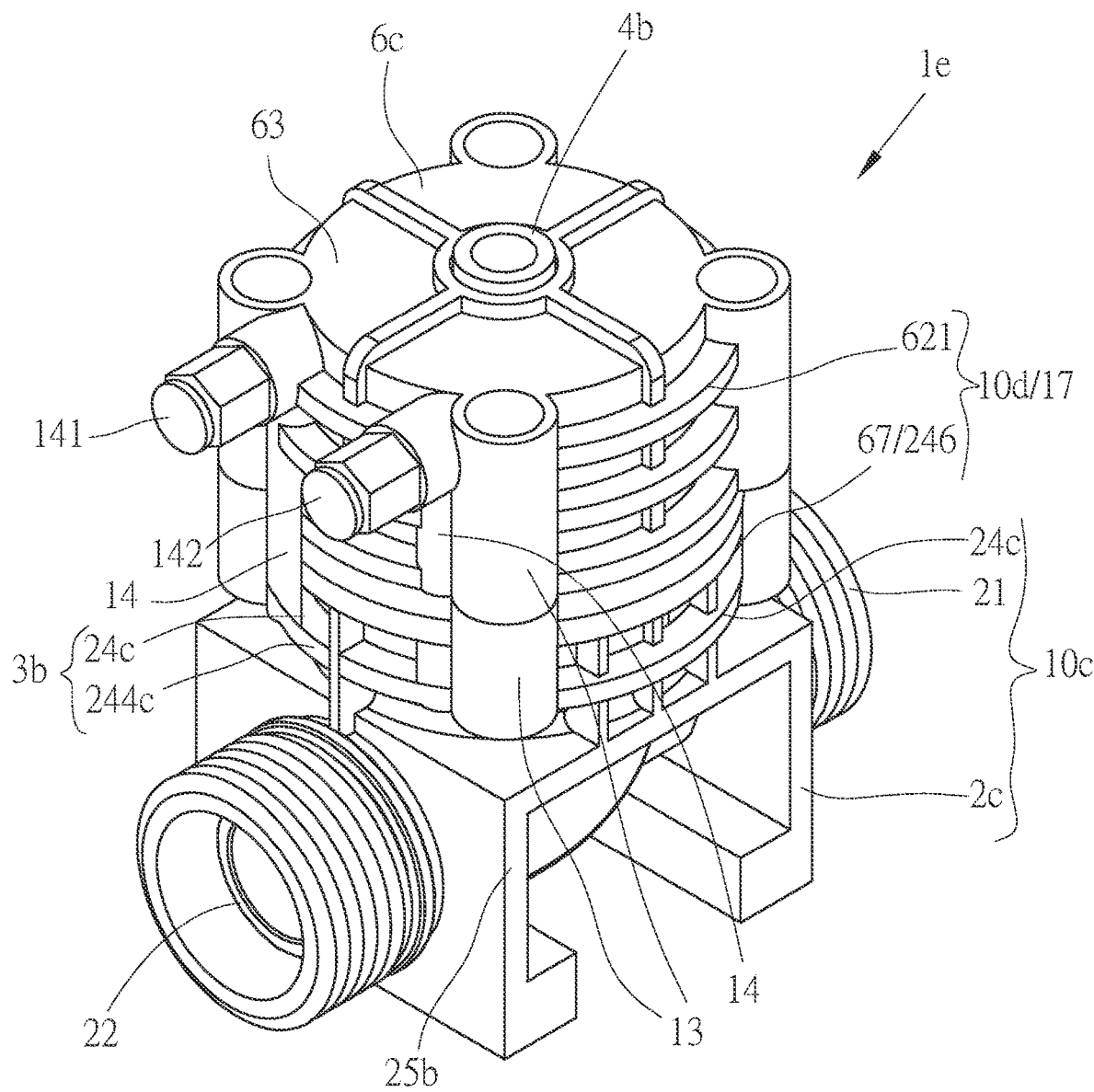
F I G . 7A

FLUORORESIN DIAPHRAGM VALVE

FIELD OF THE INVENTION

The present invention relates to a diaphragm valve structure, and more particularly to a diaphragm valve made of fluororesin materials such as PTFE, PFA, etc. It has high corrosion resistance and extremely low heat transfer coefficient of approximately 0.25 W/(mK), far lower than the heat transfer coefficient of ceramic alumina $Al_2O_3$, approximately 30 W/(mK). Such extremely low heat transfer characteristic enables this type of material to withstand an operating environment at a high temperature of 250° C. However, when the fluororesin diaphragm valve is used in high-temperature conditions, the pressure that can be operated and the structural strength it can bear will be reduced greatly. Under the needs of users, the demand for high-temperature, low-pressure and high-purity liquid transportation at a temperature of ≤200° C. is gradually increasing. The demand for high-temperature environment and high reliability is also increasing. It is still a huge challenge for a diaphragm valve made completely from fluororesin in an operating environment at a high temperature of 200° C. with high reliability.

BACKGROUND OF THE INVENTION

The fluororesin diaphragm valves in this description are referred to fluororesin valves. A valve operated in a manual manner is defined as a manual valve. A valve operated in a pneumatic manner is defined as a pneumatic valve. The fluorineresin valve is the collective name of the manual valve and the pneumatic valve. A metal diaphragm valve includes a metal diaphragm, a fluororesin valve seat, a fluororesin lining, and a fluororesin diaphragm. The valve operated in a manual manner is defined as a manual metal valve. The metal valve is the collective name of the above metal diaphragm valve.

The diaphragm valve has a long history and is widely used. Its drive method includes a manual, pneumatic, or electric drive. The parts or structures of the liquid-contact parts are made of metal, plastic, plastic lining, fluorine material, fluorine plastic lining, etc.

The conventional metal valve can easily work under high temperature and high pressure with a simple structure, can withstand the pressure wave of the pipeline, and can use corrosion-resistant metals for transporting a slight corrosive liquid. The pneumatic or manual pressure-resistant structure or the adjusting mechanism for the opening degree of the valve can make full use of the high rigidity of metal materials. For example, the tensile strength of cold-rolled 304 stainless steel sheet is 520 Mpa, and the percentage elongation is about 40%. For example, the operating liquid temperature of a valve seat made of completely metal be as high as 300° C. or 350° C.@10 $kg/cm^2$, and no cooling scheme is required. The operating liquid temperature of a PFA valve seat may reach 200° C.@10 $kg/cm^2$. The maximum operating pressure of a high-pressure metal valve may reach 100 kg/cm2@80° C., and the valve seat is PCTFE. Conventional metal valves applied to high temperature and high corrosion may use a fluororesin lining structure supported by a metal structure. At this time, the conditions of high-temperature resistance are limited by the temperature resistance characteristics of fluororesin, which may reach 200° C. or <250° C. depending on the structure.

An adjusting mechanism for the opening degree of a common manual metal valve is basically composed of a valve shaft, a diaphragm, a hand wheel, a support disc, a valve upper cover and a threaded hole. The support disc is provided with a T-shaped groove for connecting a T-shaped end of the valve shaft. A plurality of radial ribbed plates of the support disc are coupled with a plurality of radial ribbed plates on the inner side of the valve upper cover. The diaphragm is installed to the lower side of the support disc. According to the transmission mode of the valve shaft, it can be classified into two types:

For the first type, the valve shaft rotates, and the shaft hole of the valve upper cover is the threaded hole and is coupled with the valve shaft. The hand wheel is installed on the other end of the valve shaft to directly drive the valve shaft to rotate. The hand wheel will move up and down with the valve shaft. The valve shaft can be relatively rotated in the T-shaped groove.

For the second type, the valve shaft does not rotate, and the threaded hole is disposed in the inner hole of a positioning nut. The positioning nut is positioned and installed on the shaft hole of the valve upper cover and is coupled with the valve shaft. The hand wheel is connected with the positioning nut to rotate, and the valve shaft cannot rotate in the T-shaped groove, that is, the support disc provides a rotation stop function.

The transmission modes of these two types each have the following basic structural functions:

Function 1: the positioning threaded hole, exclusive to the first type, is positioned and installed on the stationary structure of the manual metal valve, such as, the shaft hole of the valve upper cover, so that the valve shaft and the threaded hole are coupled to achieve the upward and downward movement of the valve shaft.

Function 2: positioning nut, exclusive to the second type. The center hole of the positioning nut is a threaded hole. One end of the positioning nut has a flange, and the other end may be connected with the hand wheel. When the positioning nut is installed in the shaft hole of the valve upper cover, the end with the flange is located inside the valve upper cover, and the end connected with the hand wheel is located outside the valve upper cover. The slide surface on the lower side the shaft hole of the hand wheel may be coupled with the slide surface on the outer side of the central hole of the valve upper cover to achieve an axial positioning function.

Function 3: the diaphragm with an anti-rotation feature, exclusive to the first type, a mechanism is provided to isolate the rotation or torque of the valve shaft. For example, the support disc is provided with a T-shaped groove to connect the T-shaped end of the valve shaft, and the diaphragm is installed below the support disc. The support disc and the valve upper cover stop rotating and do not allow the diaphragm to bear torque.

Function 4: the valve shaft with an anti-rotation feature, exclusive to the second type. The anti-rotation feature of the valve shaft also provides the anti-rotation feature of the diaphragm. Because the positioning nut is rotated by the hand wheel, the valve shaft cannot rotate and it is necessary to stop rotation of upper and lower slide mechanisms. For example, the T-shaped groove of the support disc also provides the anti-rotation feature for the valve shaft.

That is, the transmission mode of the first type has the two functions, a pair of threaded holes and a diaphragm with an anti-rotation feature. The transmission mode of the second type has the two functions, a positioning nut and a valve shaft with an anti-rotation feature. For completing the functions of the transmission mode of the second type, a hand wheel, a valve upper cover, a positioning nut, a plurality of bolts and a support disc, a total of 5 parts, are required.

FIG. 9 illustrates a conventional lined manual metal valve 8. The opening degree of the valve is controlled by an adjusting mechanism. The transmission of the valve shaft belongs to the second type. The manual metal valve 8 includes a valve body 80, a diaphragm 81, a support disc 82, a valve upper cover 83, a valve shaft 84, a positioning nut 85, a position indicator 86, a hand wheel 87, and a set of bolts 88. The valve body 80 is a metal valve body with a fluororesin lining, and has an outlet 801, an inlet 802, a valve chamber 803, and a sealing surface 804. The support disc 82 is made of a metal material and has a T-shaped groove 821 and a plurality of ribbed plates 822. The diaphragm 81 includes a central portion 811, a peripheral portion 812, and a rubber pad 813. The positioning nut 85 has a threaded hole 851, a rotating ring 852, a fixing ring 853, a flange 854, and a positioning bolt 855. The hand wheel 87 has a central hole 871, a square hole 872, a fixing bolt hole 873, and a slide surface 874. The valve shaft 84 has a T-shaped shaft end 841, an adjusting screw thread 842, and a tail end 843. The valve upper cover 83 has an axis hole 831, a plurality of rib grooves 832, a slide surface 833, a plurality of bolt holes 834, a tightening surface 835, and a positioning hole 836. The T-shaped shaft end 841 of the valve shaft 84 is connected with the T-shaped groove 821 of the support disc 82. The diaphragm 81 and the rubber pad 813 are installed under the support disc 82. The positioning nut 85 is installed in the axis hole 831 of the valve upper cover 83. The flange 854 is located inside the valve upper cover 83.

The square hole 872 of the hand wheel 87 and the square ring 853 are connected through a set of fixing bolts 875, so that the hand wheel 87 is fixed in the axial position and located on the upper side of the valve upper cover 83, and the slide surface 833/874 of the two are coupled. The valve shaft 84 passes through the positioning nut 85 and passes through the central hole 871 of the hand wheel 87. The position indicator 86 is installed on the tail end 843. The plurality of ribbed plates 822 of the support disc 82 are coupled with the rib groove 832 of the valve upper cover 83. After the above assembly, the valve upper cover 83 and the diaphragm 81 are installed on the valve body 80. The peripheral portion 812 of the diaphragm 81 and the fastening surface 835 of the valve upper cover 83 are installed on the sealing surface 804 and tightly tightened with a plurality of bolts 88. When the hand wheel 87 is turned to open the valve to the required height, the positioning bolt 855 will pass through the positioning hole 836 of the valve upper cover 83 so that the positioning nut 85 cannot be rotated, and the valve shaft 84 will not be displaced.

The above-mentioned conventional metal valve 8 has two technical points, one is the sealing mechanism, and the other is the adjusting mechanism, as the following description:

Sealing mechanism. The peripheral portion 812 of the fluororesin diaphragm 81 is tightened annularly by the tightening surface 835 of the valve upper cover 83. The high-pressure sealing effect is achieved by the metal high-rigidity valve body structure without cooling. The rubber pad 813 cannot withstand high temperature.

Adjusting mechanism: The first and second types are easy to implement because the metal rigidity can easily achieve the adjusting function. As long as the positioning bolt 855 is used to tighten the positioning nut 85 and the valve upper cover 83 in the positioning hole 836, the opening degree of the valve can be fixed. The metal adjusting screw thread 842 can withstand pipeline pressure waves.

As explained above, the manual metal valve has the characteristics of simple structure and easy operation. However, when a corrosive liquid is transported, highly corrosive molecules easily permeate through the diaphragm in a small amount. After a period of time, the metal screw thread is easy to corrode and cannot be rotated, and there will be concerns about metal contamination in the high-purity process. This is the reason why many processes only choose fluororesin valves.

The tensile strength of fluororesin PFA is 29 Mpa, the percentage elongation is >300%, and the melting point is 280° C. The strength will decrease significantly as the temperature rises. The working pressure of the conventional fluororesin diaphragm valve is 5 bar@90° C. and 1 bar@150° C. In addition, a PTFE filter casing similar to a container structure has a maximum operating temperature of 210° C. and a working pressure of 7 bar@270° C.

The structure of the fluororesin diaphragm valve cannot compare with the metal diaphragm valve in terms of temperature and pressure resistance. For meeting the requirements of high temperature and high pressure, the manual valve has three technical points: one is thermal isolation, another is the sealing mechanism, and the other is the adjusting mechanism, as the following description:

Thermal isolation: The thermal isolation method includes a heat transfer restriction structure and a heat dissipation structure, which isolates the heat source area from the high-temperature chemical liquid and from the structure requiring structural strength, and provides appropriate cooling including internal cooling. This can maintain the structure at a lower temperature to maintain the strength of the structure and increase the operating temperature of the diaphragm valve.

Sealing mechanism: The high elongation of a fluoro material and the use of the fluoro material of the same hardness as the annular tightness will cause the material to move under the compression and tensile deformation of the diaphragm, which will cause the annular tightness to fail. It will be more serious at high temperatures, and this situation can be greatly reduced under thermal isolation.

Adjusting mechanism: The adjusting mechanism for the opening degree of the valve cannot directly use the screw thread of the valve shaft to withstand the pipeline pressure wave. It is required to have a locking mechanism and a transmission mechanism to transmit the pressure wave to the overall structure. The thermal isolation can maintain the rigidity and accuracy of the structure.

At present, the demand for the characteristics of fluororesin valves with high temperature resistance and high pressure resistance is still increasing. Before 2018, most fluororesin diaphragm valves are used for medium and low temperature, <120° C., specially designed for high temperature use, <150° C. normal temperature operating pressure 3 kg/cm$^2$-5 kg/cm$^2$. After 2018, a new fluororesin pneumatic diaphragm valve was proposed. In 2020, Taiwan Patent Publication No. TW202010966(A) discloses a diaphragm valve structure and a thermal isolation method. It can be operated at 160° C. without forced cooling of a gas, and at 200° C. with forced cooling of the gas. The working pressure at room temperature is 5 kg/cm$^2$-7 kg/cm$^2$, which can avoid the pollution of metal parts in the high-purity process.

The following problems 1 to 5 are the core problems of manual valve applications at high temperatures. The thermal isolation method is further improved and the sealing structure is strengthened to meet the new requirements as the operating temperature is 200° C. without cooling, the temperature requirement is 230° C. with forced cooling, and the ambient temperature is ≤100° C.

Problem 1. Operating temperature: The conventional high-temperature thermal isolation method needs to be used and further improved, and its structural strength needs to be strengthened again. The heat transfer restriction structure uses high-strength latticed ribbed plates with a plurality of horizontal openings, which need to be strengthened again to force the cooling gas to flow through the sealing structure.

Problem 2. Ambient temperature: the special ambient temperature is ≤100° C., and the common ambient temperature is <60° C.

Problem 3. Annular tightness: The disc portion is tightened by the tightening ring of the diaphragm. When the disc portion is subjected to pressure waves, the material of the peripheral portion will move due to the expansion of the diaphragm, especially the movement of the material of the peripheral portion. High temperature will increase the deterioration of the movement of the material and cause the tightness of the peripheral portion to fail and leak. The reliability of the sealing mechanism can be improved if the tightening ring of the diaphragm can stop the movement the material of the peripheral portion.

The above three problems will cause the creep of the material to result in the seal leakage of the diaphragm. In addition to the foregoing thermal isolation method, it is necessary to increase the strength of the sealing structure to overcome the leakage problem caused by the creep of the material. The common annular tightness is mostly implemented through a C-shaped tightening structure. A force-applying member located above the diaphragm presses the diaphragm against a sealing surface of the annular portion to form a C-shaped tightening structure. The force-applying member is locked to the valve body through a screw thread or a bolt. The C-shaped tightening structure includes a tightening portion, a support arm, and a base. The force-applying member serves as the tightening portion. The support arm serves as the valve body. The base is the peripheral portion of a valve chamber of the valve body and serves as the sealing surface. The force-applying member is moved downward by locking tightly, so that the compressed diaphragm is clamped to prevent leakage. It is helpful to use a heavy structure for the force-applying member above the diaphragm and the valve body to make annular tightness. However, at a high temperature, such a heavy structure without thermal isolation is likely to cause deformation. As a result, the valve shaft cannot be centered to shorten its service life. Other parts that do not need to be centered, such as pipe joints, will not be problematic when using the heavy structure at a high temperature. Responding to the above three problems with acceptable test standards, after the diaphragm of the tested fluororesin valve is tightly connected with the parts in contact with the liquid, the baking temperature=200° C.@baking time>=6 hours. Under normal temperature, without any adjustment, the high pressure leakage is tested, and the high pressure is >=10 kg/cm². Only through such a test without leakage, it can prove that the sealing structure can still meet the requirements for high air tightness under a high-temperature operation.

The innovative core of the adjusting mechanism is to transmit the pressure wave to the valve body to overcome the following problems:

Problem 4. Damage to the valve shaft: The valve shaft of the manual valve is an independent part. The pressure wave directly transmitted from the upstream will directly impact the diaphragm from the valve inlet and be transmitted to the valve shaft, and be applied to the screw thread of the valve shaft. When the screw thread is damaged, it will cause the internal leakage of the pipeline due to improper tightness.

Problem 5. Positional locking: The valve shaft of the manual valve cannot be locked after positioning, and its opening degree will be affected by the pressure wave and cause the adjustment to be easily damaged. The adjusting mechanism must be locked on the structure after positioning.

The necessary additional functions of the adjusting mechanism must overcome the following problems:

Problem 6. Position indication: An indicator for indicating the opening degree of the valve is a very common device used in the fluororesin valve. The pneumatic valve only has ON/OFF indication, but there are still many products without such a device. The manual valve needs to be able to further display the opening degree of the valve after being adjusted.

Problem 7. Positioning distortion: The diaphragm of the manual valve is deformed by the backlash and structure of the coupling screw thread, and the center of the diaphragm and the valve seat are deformed to cause positioning distortion. It is necessary to adjust the positioning to zero and to correctly indicate the position of the opening degree of the valve. The pneumatic valve rarely has such a demand.

Problem 8. Diaphragm overpressure: It is required for the manual valve to effectively control the sealing force. However, the positioning distortion may cause that the diaphragm is locked too tight to damage the diaphragm and valve seat. The pneumatic valve rarely has such a demand.

Problem 9. Wrong operation: After completing the setting of the opening degree of the manual valve, it is not expected that unrelated operators operate the valve incorrectly.

The adjusting mechanism needs to provide a leakage warning to overcome the following problems:

Problem 10. Leakage warning: Most of leakage is caused by the penetration of corrosive liquid molecules. For example, small molecular liquids, such as hydrofluoric acid and hydrochloric acid, may penetrate the diaphragm in a small amount. It is required for the valve shaft to be equipped with a shaft sealing device for delaying the spread of acid gas. When the diaphragm has a slight leak, a leak warning is needed or the leaked liquid can be collected. This is relatively common in the pneumatic valve and less in the manual valve. The fluororesin valve needs to have this function in the future.

In the past, users had part of the needs similar to these ten needs, and utilized part of the prior art to meet their needs. However, it is necessary to overcome the above ten problems at the same time for the same manual valve, in order to use the manual valve more conveniently and effectively, with high reliability. That is, overcoming the above ten problems at the same time is the new demand for the manual valve. The sealing mechanism of these technologies is also very valuable when implemented in the pneumatic valve, but the pneumatic valve does not need to use the adjusting mechanism. References of the prior art are described below.

Reference 1

With reference to the 2020 US Patent Early Publication No. US20200072384A1 titled "Diaphragm Valve Structure", the invention is also published in the 2020 Taiwan Patent Publication No. TW202010966(A) titled "Diaphragm Valve Structure". The embodiment is a pneumatic valve, which implements thermal isolation, but its sealing mechanism cannot meet new requirements. The core of the solution is the thermal isolation method and its unique structure. The heat source area of the diaphragm valve includes a valve chamber heat source area, a flow channel heat source area, an inlet pipe heat source area, an outlet pipe heat source area, an inlet joint heat source area, and an outlet joint heat source area. The high-temperature thermal isolation method of the valve body includes a heat transfer restriction structure and a heat dissipation structure. The heat transfer restriction structure is installed at a square portion, an annular portion, and the minimum diameter area of the annular portion of the valve body. The square portion is equipped with high-strength lattice-shaped ribbed plates with horizontal openings to reduce the heat transfer cross-sectional area and improve the external heat dissipation effect. The annular portion is provided with a plurality of vertical heat dissipation ribbed plates. The minimum diameter area has heat transfer sectional area restriction, so that the valve shaft and the cylinder structure can reduce heat transfer and cool down. The internal cooling gas of the heat dissipation structure flows through the cooling gas hole and the gas annular groove of the valve body, and flows through the cooling gas guide hole of the upper valve body, and then flows through the gas guide hole and the axis hole of the valve shaft. The high-temperature thermal isolation method of the valve body has a unique structure designed to meet the demands for high-pressure gas driving, liquid static elimination, metal locking valve body, non-metal locking valve body, preventing structural creep, no particle release, leakage detection, position indication of the valve shaft, and so on. The valve of this reference can be operated at 160° C. without forced cooling of a gas, and at 200° C. with forced cooling of the gas. The working pressure at room temperature is 5 kg/cm²-7 kg/cm². Besides, the problem that process engineers need to pay attention to the pollution caused by the corrosion of metal bolts from time to time is solved. This reference takes a pneumatic valve as an example, and proposes a very good basic solution for operating temperature (Problem 1) and ambient temperature (Problem 2). Unfortunately, it still does not meet the current needs for an operating environment at a temperature of 200° C. without the cooling of a gas. This reference sets forth the solution to the annular tightness (Problem 3) in an operating environment at a temperature of 160° C. without the cooling of a gas. But, it still cannot meet the new need for an operating environment at a temperature of 200° C. without the cooling of a gas. This reference takes a pneumatic valve as an example, and the opening degree of the valve is only ON/OFF. There is no solution to the opening limit of the diaphragm and the damage to the valve shaft (Problem 4). The position indication (Problem 6) of the valve shaft only has ON/OFF indication, without the opening indication of the diaphragm. In this reference, the positional locking (Problem 5), positioning distortion (Problem 7), diaphragm overpressure (Problem 8) and wrong operation (Problem 9) will not occur at high frequency in the pneumatic valve. This reference proposes a perfect solution to the leakage warning (Problem 10).

In this reference, the valve has a substantially C-shaped tightening structure. The C-shaped tightening structure includes a tightening portion, a support arm, and a base. The force-applying member is an upper valve body. The support arm is the annular portion of the valve body. The annular portion is provided with a plurality of vertical ribbed plates with heat dissipation function and structural strengthening. The upper valve body is tightly locked to the inner screw thread of the annular portion. The minimum diameter area has a heat transfer cross-sectional area limit. The base is the peripheral portion of the valve chamber of the valve body as the sealing surface. The upper valve body is moved downward by locking tightly, so that the tightened diaphragm is clamped to prevent leakage. In this reference, the strength of the support arm of the C-shaped tightening structure is still insufficient for an operating environment at a temperature of 200° C. without the cooling of a gas.

Reference 2

The 2016 Chinese Patent No. CN205350538U discloses a manual diaphragm valve, which is the first type of manual valves or manual metal valves, including a valve body and a handwheel actuator. The opening and closing of the diaphragm is dependent on the coupling of the screw thread of the valve sleeve under the hand wheel and the screw thread of the valve shaft. The valve shaft includes a position indicator passing through the center of the hand wheel for displaying the position of the valve shaft. Its characteristic is that an upper locking piece is connected to the hand wheel and a lower locking piece is connected to the valve upper cover. The upper locking piece and the lower locking piece each have a locking hole. A pin passes through the locking hole to fix the hand wheel and ensure that the valve shaft will not move up and down.

This reference does not mention the operating temperature (Problem 1), ambient temperature (Problem 2), annular tightness (Problem 3), damage to the valve shaft (Problem 4), diaphragm overpressure (Problem 8), positioning distortion (Problem 7), wrong operation (Problem 9) and leakage warning (Problem 10). This reference proposes solutions for positional locking (Problem 5) and position indication (Problem 6). This reference cannot meet all new requirements.

Reference 3

The 2012 Chinese Patent No. CN102758935A discloses a diaphragm valve structure, which is the first type of manual valves or manual metal valves. The objective of this reference is to improve the problem of unclear positioning of the indication disc on the valve shaft of the manual valve and to propose a linear position indicator that is moved simultaneously with the valve shaft (Problem 6). This reference does not mention the operating temperature (Problem 1), ambient temperature (Problem 2), annular tightness (Problem 3), damage to the valve shaft (Problem 4), positional locking (Problem 5), positioning distortion (Problem 7), diaphragm overpressure (Problem 8), wrong operation (Problem 9) and leakage warning (Problem 10). This reference cannot meet all new requirements.

Reference 4

The 2015 Chinese Patent No. CN204114227U discloses a novel fluorine lined diaphragm valve, which is the first type of manual metal valves. The objective of this reference is to improve the lack of position indication (Problem 6) on the valve shaft, which will cause diaphragm overpressure (Problem 8) with excessive locking pressure when closing. This reference only proposes a solution to the position indication (Problem 6). This reference does not mention the operating temperature (Problem 1), ambient temperature (Problem 2), annular tightness (Problem 3), damage to the valve shaft (Problem 4), positional locking (Problem 5), positioning distortion (Problem 7), diaphragm overpressure (Problem 8), wrong operation (Problem 9) and leakage warning (Problem 10). This reference cannot meet all new requirements.

Reference 5

The 2015 Chinese Patent No. CN204344989U discloses a diaphragm valve, which is the first type of manual metal valves. This reference has two objectives. One is to improve the diaphragm that needs to withstand instantaneous pressure, and the other is that the diaphragm will not be damaged in a high-temperature environment. The structure of this reference includes a position indication (Problem 6). The solution of this reference is to provide an opening on the non-liquid contact side of the center of the diaphragm. An elastic member is placed inside the opening. The bottom of the valve shaft is in contact with the elastic member. This solves the problems of damage to the valve shaft (Problem 4), positioning distortion (Problem 7) and diaphragm overpressure (Problem 8). This reference does not mention the operating temperature (Problem 1), ambient temperature (Problem 2), annular tightness (Problem 3), positional locking (Problem 5), wrong operation (Problem 9) and leakage warning (Problem 10). This reference cannot meet all new requirements. The illustration of the conventional elastic member used in this reference shows that the metal spring is positioned above the diaphragm. In high temperature and high corrosion applications, the conveying liquid will be contaminated due to the corrosion of the acid gas on the metal. Such a situation will not be accepted by process users. In addition, the countermeasures for high temperature applications in the document are limited to the protection of the circumference of the diaphragm. This solution is not a complete solution for annular tightness (Problem 3), and it lacks the problem of creep of the diaphragm and structure due to high temperature. This reference cannot meet all new requirements. Another similar reference, in 2017, Taiwan Patent No. TW1670439B discloses a weir type manual opening-closing valve capable of providing good operability and stable sealing property in rotating the handle. The metal manual valve is also made of a spring to achieve similar functions.

Reference 6

The 2018 Chinese Patent No. CN207648146U discloses a diaphragm valve, which may be the first or second type of manual metal valves. This reference is applied to manual diaphragm valves for applications at a temperature not greater than 200° C. In this reference, the valve body is equipped with a stopper, and a sensor is connected to an external flashing bead, so that the user will not continue to squeeze the diaphragm when the diaphragm is closed, causing the diaphragm to overpressure (Problem 8). The valve shaft is equipped with a position indication (Problem 6). These two functions are convenient for users. Secondly, the valve disc is installed at the bottom end of the valve shaft. An elastic rubber is installed between the valve disc and the fluorine diaphragm. This can only partially solve the problems of annular tightness (Problem 3), damage to the valve shaft (Problem 4), positioning distortion (Problem 7), and diaphragm overpressure (Problem 8). The high temperature will also cause the elastic rubber to fail. Wrong operation (Problem 9) and leakage warning (Problem 10) are not proposed. The stopper reduces the diaphragm overpressure (Problem 8). This reference is a metal valve. The fluorine valve body is lined with a metal structure. It is suitable for high operating temperature of 200° C. (Problem 1), and can greatly reduce the problem of creep of the fluorine structural body, and it is also suitable for high ambient temperature (Problem 2). There is no need for the high-strength adjusting mechanism of the metal shaft to consider positional locking (Problem 5). This is the advantage of the fluorine diaphragm valve lined with the metal structure. The valve is applicable at a high operating temperature of 200° C. without structural design for cooling (Problem 1). However, the diaphragm valve completely from fluororesin cannot easily achieve this function and needs more consideration.

Reference 7

The 2018 Chinese Patent No. CN207906557U discloses a high temperature that adopts movable sleeve loop to construct does not have leakage diaphragm valve, which is the first type of manual metal valves. The structure of this reference is a manual diaphragm valve suitable for high temperature and high pressure applications, and the opening degree of the diaphragm can be adjusted with an adjusting lever. However, this reference does not specify whether the valve body is a metal structure. It is mentioned that the working pressure of the diaphragm valve is <10 bar. This situation mostly refers to metal valves, and fluororesin diaphragm valves cannot be achieved due to material restrictions. In this reference, the maximum nominal pressure can reach PN63, and the maximum temperature is <=200° C. The pressure resistance is 5 times higher than that of the prior art, without any cooling design, which is also the characteristic of metal valves. The characteristic of this reference is that a plurality of support collars sleeved with each other are installed above the diaphragm and inside the valve cover. When under high pressure, the support collars move upwards respectively to match the deformed shape of the diaphragm to improve the pressure-bearing capacity of the diaphragm. The support collars are more suitable for the use of heat-resistant and corrosion-resistant plastic materials. This reference does not set forth whether the above-mentioned maximum temperature and maximum pressure are reached at the same time. Because the same conditions are achieved, it must be a metal structure. The fluororesin structure cannot achieve such operating conditions at the same time. This reference refers to a metal valve, which is suitable for 200° C. high operating temperature (Problem 1). The restriction should be caused by the material of the diaphragm, and it is suitable for high ambient temperature (Problem 2). The support collars of this reference can overcome the problems of annular tightness (Problem 3), damage to the valve shaft (Problem 4), positioning distortion (Problem 7), and diaphragm overpressure (Problem 8). However, this reference does not mention positional locking (Problem 5). If it is a metal valve, this problem can be ignored. This reference proposes a leak warning (Problem 10), and the position indication (Problem 6) can only be replaced by an adjusting lever, which failures to prevent wrong operations (Problem 9).

Reference 8

The 1995 U.S. Pat. No. 5,377,956A discloses a diaphragm valve, which is the first type of manual metal valves. The structure of this reference is suitable for manual lined metal valves that can adjust the opening degree of the diaphragm and prevent the problem of diaphragm overpressure (Problem 7). A nut that moves with the hand wheel is installed on the external screw thread of the valve shaft. The top of the inner side of a shaft hole of the nut abuts against the upper edge of the valve body. The outer edge of the nut has an axial toothed portion (polygon teeth) to be coupled with a toothed portion (polygon teeth) on the inner side of the axial cylinder under a hand wheel. That is, when the hand wheel is turned, the nut will move up and down in synchronization with the rotation of the valve shaft. The center of the hand wheel has a square hole to be coupled with the tail end of the valve shaft, so that the hand wheel is fixed at the tail end of the valve shaft via a locking bolt. When opening the valve manually, the valve shaft is turned to the required opening position with the hand wheel. When the manual valve is fully closed, the hand wheel is turned until the nut abuts against the upper edge of the valve body. This can prevents the problem of diaphragm overpressure (Problem 7). For setting the opening degree of the diaphragm, the locking bolt is loosened to remove the hand wheel, and the position of the valve shaft is readjusted. The position of the nut is lowered to the upper edge of the upper valve body, and then the handle wheel is installed. The characteristic of synchronization of the hand wheel and the nut can prevent the valve from being closed and maintain the opening degree of the valve. This reference refers to the metal lined valve and does not mention the operating temperature (Problem 1), ambient temperature (Problem 2), annular tightness (Problem 3), damage to the valve shaft (Problem 4), position indication (Problem 6), positioning distortion (Problem 7), wrong operation (Problem 9) and leakage warning (Problem 10). This reference uses the nut that is moved with the hand wheel to overcome the problems of positional locking (Problem 5), diaphragm overpressure (Problem 8). The positional locking (Problem 5) only downward locking, lack of upward locking. If it is a metal valve, this design is acceptable. If the manual valve is subjected to pipeline pressure waves, the valve shaft will be damaged (Problem 4). Moreover, it is necessary to remove the hand wheel when setting the opening degree of the diaphragm. The operation is inconvenient.

Reference 9

The 2012 U.S. Patent No. US2012056120A1 discloses a diaphragm valve, and this invention is also published in the 2014 CN102388248B titled "Membrane Valve". This is the second type of transmission, having two functions: a positioning nut and a valve shaft with an anti-rotation feature. The transmission of the valve shaft uses five parts: a hand wheel, a positioning nut, a support plate (pressure member), a pin, a connecting nut.

Thermal isolation: There is no thermal isolation for internal cooling. It cannot meet the needs of high-temperature use.

Sealing mechanism: The outer casing of the valve upper cover (the upper portion of the casing) can be tightly locked on the external ring surface of the valve body (accommodating area). The outer casing presses the inner casing downward, so that the diaphragm is pressed against the bottom of the accommodating area by the lower edge of the inner casing. This reference has a C-shaped tightening structure. The C-shaped tightening structure includes a tightening portion, a support arm, and a base. The force-applying member is an inner casing. The inner casing is tightly locked in an accommodating area of a casing by an outer casing. The support arm is the accommodating area of the valve body. The base of the C-shaped tightening structure lacks rigid support, and is a great thickness structure without thermal isolation. It cannot be operated at a temperature of 200° C. without gas cooling.

Adjusting mechanism: No solutions to positional locking (Problem 5) and damage to the valve shaft (Problem 4). The hand wheel has a spline sleeve to be coupled to the positioning nut. The anti-rotation function of the valve shaft comes from the axial movement of the support disc (pressure member) and provides the anti-rotation function of the diaphragm at the same time. The back side of the diaphragm is provided with a rubber pad, so that the diaphragm can be directly pressed by the inner casing.

This reference has three characteristics. The main characteristic is that the flow channel has a smooth cross-sectional area. The flow channel between the inlet and the outlet contains an elliptical cross section of equal area and smoothly passes through to the circular cross section of the inlet and the outlet. Secondly, the sealing mechanism, the valve upper cover (the upper portion of the casing) is composed of an outer casing and an inner casing.

Sealing mechanism: The outer casing is tightly locked on the external ring surface of the valve body (accommodating area). The outer casing presses the inner casing downward, so that the diaphragm is pressed against the bottom of the accommodating area by the lower edge of the inner casing. The internal ring surface of the accommodating area has a plurality of axial grooves to be coupled with a plurality of axial bosses on the external ring surface of the inner casing. When the outer casing is tightened, the inner casing does not rotate and seals the diaphragm well. This is a good solution to annular tightness (Problem 3). However, the base of the C-shaped fastening structure lacks rigid support, has a thick structure, and lacks a heat transfer restriction structure and a heat dissipation structure. Thirdly, diaphragm overpressure (Problem 8), the hand wheel is connected to the positioning nut to rotate. One end of the valve shaft, coupled with the diaphragm, is coupled to a connecting nut with a pin. A fastening nut of the diaphragm is installed inside the connecting nut. The fastening nut has an axial movement space. When the valve shaft tightens the diaphragm, the axial movement space can reduce the diaphragm overpressure (Problem 8). This reference does not mention the operating temperature (Problem 1), ambient temperature (Problem 2), damage to the valve shaft (Problem 4), positional locking (Problem 5), position indication (Problem 6), positioning distortion (Problem 7), wrong operation (Problem 9) and leakage warning (Problem 10). This reference can only be used at low temperatures and cannot meet all new high-temperature requirements.

Reference 10

The 2012 Japanese Patent No. JP2012189088A discloses a manual valve, which is the second type of transmission, having two functions: a positioning nut and a valve shaft with an anti-rotation feature. The transmission of the valve shaft uses five parts: a hand wheel, a positioning nut, a bolt, a shaft sleeve, and a pin.

Thermal isolation: There is no thermal isolation for internal cooling. It cannot meet the needs of high-temperature use.

Sealing mechanism: The inner side of the valve upper cover contains a slide nut and a rod guide arranged in a vertical direction. The valve upper cover is tightly locked to the internal ring surface of the opening side of the valve body, the bottom of the opening side is the valve chamber, and the positioning nut is tightened downward and the shaft sleeve is tightened. The shaft sleeve is fixed to the pump body by a pin. The diaphragm is directly pressed against the bottom area of the valve chamber of the valve body by the lower edge of the shaft sleeve. This reference has a C-shaped tightening structure. The C-shaped tightening structure includes a tightening portion, a support arm, and a base. The force-applying member is a hollow guide post. The guide post is tightly locked in an accommodating area of a pump body by an outer casing. The support arm is the accommodating area of the valve body. The base of the C-shaped tightening structure lacks rigid support, has a thickness structure, lacks a heat transfer restriction structure and a heat dissipation structure, and has no thermal isolation. It cannot be operated at a temperature of 200° C. without gas cooling.

Adjusting mechanism: having positional locking (Problem 5). The hand wheel and the positioning nut are coupled with a bolt. However, in a plastic structure, this may loosen or damage the parts easily. The valve shaft is still damaged after long-term use (Problem 4). The anti-rotation function of the diaphragm comes from the rod guide. This reference has three characteristics. The main characteristic is diaphragm overpressure (Problem 8). The manual mechanism is installed in the valve upper cover. A stop ring is installed on the valve shaft structure for tightening a pressurized O-ring installed on the top of the shaft sleeve. When the valve shaft moves downward to close the valve, the stop ring will first compress the O-ring. This can solve the problem of diaphragm overpressure (Problem 8) that is damaged by excessive torque applied to the valve. Secondly, the sealing mechanism, the opening side of the valve body contains the valve upper cover, the positioning nut and the shaft sleeve. When the valve upper cover is tightly locked, the diaphragm can be tightened. It has a thick structure but lacks a heat transfer restriction structure and a heat dissipation structure. Thirdly, the adjusting hand wheel of this reference is bolted to the positioning nut and the positioning nut can be rotated. When a proper opening degree is adjusted, the positioning nut can be tightly locked on the valve upper cover with a bolt. The tail end of the valve shaft is equipped with a position indication (Problem 6). The valve shaft can achieve positional locking (Problem 5). There will be no damage to the valve shaft (Problem 4), and there will be no wrong operation (Problem 9). However, in long-term use, due to material problems, it still has the problems of positional locking (Problem 5) and damage to the valve shaft (Problem 4). This reference does not mention the operating temperature (Problem 1), ambient temperature (Problem 2), positioning distortion (Problem 7), and leakage warning (Problem 10). This reference cannot meet all new high-temperature requirements. The 2020 Japanese Patent No. JP2020037970A discloses a wrong operation preventive cover and manual valve with wrong operation preventive cover. The device for preventing wrong operation (Problem 9) has three parts, namely, a fixing ring, a protective cover and a detection portion. This reference does not mention the operating temperature (Problem 1), ambient temperature (Problem 2), damage to the valve shaft (Problem 4), position indication (Problem 6), positioning distortion (Problem 7) and leakage warning (Problem 10). This reference cannot meet all new high-temperature requirements.

As to the solutions of the above-mentioned ten references, only the first reference proposes a high-temperature isolation solution, the rest of the references propose partial solutions at room temperature. That is to say, no reference meets the core requirements of manual valves that take into account Problems 1 to 5. Problems 1 to 3 have not been resolved. The support arm of the C-shaped fastening structure of Reference 1 has no insufficient strength. The base of the C-shaped fastening structure of Reference 9 and Reference 10 lacks rigid support, has great thickness and does not have thermal isolation. None of these three references meets the requirements at an operating temperature of 200° C. without gas cooling. Position indication (Problem 6) is a common practice. Reference 9 and Reference 10 lack a better mechanism to simultaneously overcome the problems of damage to the valve shaft (Problem 4) and positional locking (Problem 5), only using a bolt to achieve the locking function. Although installing a spring on the valve shaft or adding a rubber member on the non-liquid contact side of the diaphragm can solve the problem of diaphragm overpressure (Problem 8), it does not specify whether it is suitable for being used at a high operating temperature of 200° C., and it does not provide a better solution to positional locking (Problem 5) and positioning distortion (Problem 7). Rubber material cannot be used at a high temperature of 200° C. When the metal elastic material directly installed on the non-liquid contact side of the diaphragm is used in the high-purity process, there will be a concern about metal contamination.

SUMMARY OF THE INVENTION

A sealing structure of the present invention must pass the following test conditions to meet the requirements of operating temperature (Problem 1), ambient temperature (Problem 2), annular tightness (Problem 3), etc.

The test assembly only includes the assembly that requires a high-temperature and high-pressure testing, including a valve body, a diaphragm, an upper valve body, a tightening ring, a valve shaft, etc., which does not include the support of a valve upper cover. Baking temperature=200° C.@baking time>=6 hours. When the tested fluororesin valve returns to the normal temperature, without any locking adjustment, only necessary seals such as inlets and outlets are applied for high-pressure leak testing. Test pressure>=10 kg/cm$^2$, no leakage.

Such a baking, without heat dissipation, is more severe than the actual conditions of use, and it is completely testing the annular tightness of the sealing structure (Problem 3). The structural creep at a high temperature may cause the deformation of the sealing surface and reduce the tightening force. The test can ensure normal operation at ≤200° C. without forced gas cooling and high reliability operation at ≤230° C. when forced gas cooling is provided, operating temperature (Problem 1), and it can operate at an ambient temperature of 100° C., the ambient temperature (Problem 2), which means that the sealing mechanism completely solves the annular tightness (Problem 3).

The present invention is based on the technology of Reference 1, the 2020 Taiwan Patent No. TW202010966 (A) titled "Diaphragm Valve Structure", and uses the conventional high-temperature thermal isolation method, including heat transfer restriction method and heat dissipation method, to develop an innovative sealing mechanism and an innovative adjusting mechanism. The innovation of the sealing mechanism is to strengthen the C-shaped tightening structure and to provide a leakage warning function (Problem 10), which is suitable for pneumatic valves and manual valves.

A fluororesin diaphragm valve takes a manual valve as an example.

The manual valve consists of a sealing mechanism and a valve portion to propose an innovation and find solutions to the operating temperature (Problem 1), ambient temperature (Problem 2), and annular tightness (Problem 3). A fluororesin diaphragm valve structure is used for fluid transportation at 200° C. without forced cooling of an external gas. The difference in the components of the sealing mechanism is distinguished into a basic mode, a first implementation mode, a second implementation mode, a third implementation mode, and a fourth implementation mode.

In the basic mode, the sealing mechanism of the fluororesin diaphragm valve comprises related parts and mechanisms of a valve portion. The valve portion includes a valve body, a force-applying member, a valve upper cover, a diaphragm, and a tightening ring. The valve body includes an inlet, an outlet, a valve chamber, an annular portion, and a square portion. The annular portion includes a sealing surface, an external ring surface, a minimum diameter area, an internal ring surface, and a ribbed plate structure. The annular portion is a cup-shaped structure having an opening. A bottom of the annular portion is defined as the valve chamber. The opening is closed by the valve upper cover. The valve upper cover includes an inner accommodating chamber, an external ring surface, a top, and a central hole.

The diaphragm includes a peripheral portion, an elastic portion, and a central portion. One end of the valve shaft has a fixing end capable of locking the central portion of the diaphragm.

The sealing mechanism includes the annular portion, the ribbed plate structure, the sealing surface, the diaphragm, the tightening ring, the force-applying member, and a tightening surface. The tightening surface is a structural surface of the force-applying member. The tightening surface connects the annular portion to the sealing surface to form a C-shaped tightening structure. A tightening portion of the C-shaped tightening structure includes the force-applying member. The force-applying member is tightly locked to the annular portion. A support arm of the C-shaped tightening structure provides overall structural strength for the annular portion and the ribbed plate structure. A base of the C-shaped tightening structure is the sealing surface, which is supported by the minimum diameter area, a flow channel side wall of the valve chamber and the ribbed plate structure. The tightening surface is moved downward by locking tightly, so that the tightening ring and the diaphragm are clamped by the tightening surface and the sealing surface to prevent leakage.

The tightening ring is an annular structure with an approximately rectangular cross-section, and has two ends defined as a force-receiving end and a tightening end. The tightening end is an obtuse angle.

The ribbed plate structure is located on the external ring surface of the annular portion, and is an annular latticed structure with a plurality of horizontal openings. The ribbed plate structure is axially connected to the square portion, and its axial position contains the structure of the minimum diameter area, the tightening ring and the tightening surface.

When the diaphragm is installed in the valve chamber, the peripheral portion is attached to the sealing surface. The tightening ring is installed in the tightening groove of the force-applying member. The tightening surface applies a force F to the force-receiving end, so that the tightening end having the obtuse angle β is tightened on the peripheral portion. The obtuse angle β is in the range of $110°≤β≤150°$. When the sealing surface is applied with the force F, it is supported by the ribbed plate structure of the annular portion, and is supported by the square portion and the flow channel side wall of the valve chamber. The tightening force F has a force-applying angle ε with a normal line N of a force-applying surface of the peripheral portion. The force-applying angle ε is in the range $0°<ε≤15°$.

The ribbed plate structure is an annular latticed structure with a plurality of horizontal openings. The ribbed plate structure is located on the external ring surface of the annular portion. One side of the ribbed plate structure in the axial direction is connected with the square portion, and the distribution position contains the minimum diameter area. The other side of the ribbed plate structure in the axial direction contains the tightening ring. The minimum diameter area has a heat transfer cross-sectional restriction to reduce heat transfer.

When the diaphragm is expanded and deformed under the pressure of the pipeline, the peripheral portion will be applied with a force and pulled to generate a displacement. The peripheral portion has a wedge-shaped cross-section, with a greater thickness on its outer side and a less thickness on its inner side connected to the elastic portion.

The peripheral portion includes upper and lower side surfaces. The upper side surface is defined as a force-receiving surface, and the lower side surface is defined as a fitting surface. The fitting surface and the force-receiving surface are mutually non-planar surfaces or conical surfaces. The fitting surface is attached to the sealing surface of the annular portion. The force-receiving surface will be pressed tightly by the tightening end of the tightening ring. The sealing surface may be a conical surface or a planar surface.

In the first implementation mode, the exterior ring surface of the annular portion is provided with an external screw thread. The other side of the ribbed plate structure in the axial direction is connected to the external screw thread. The valve upper cover includes an inner accommodating chamber, an external ring surface, an internal screw thread, a top, a shaft hub portion, a central hole, and a sealing ribbed plate. The force-applying member is the sealing ribbed plate. The sealing ribbed plate is located between the shaft hub portion and the internal screw thread. A threaded groove is formed between the annular sealing ribbed plate and the internal screw thread. A shaft hub groove is formed between the shaft hub portion and the annular sealing ribbed plate. A lower end of the annular sealing ribbed plate is formed with an annular tightening groove. An opening of the groove faces the internal screw thread and faces downward. The tightening surface is provided at an upper bottom of the tightening groove. The tightening ring is installed in the annular tightening groove. A plurality of radial ribs are connected between the shaft hub portion and the annular sealing ribbed plate to provide higher rigidity of the sealing ribbed plate and to isolate heat transferred from the valve shaft. When the valve upper cover is tightly closed by the annular portion, the structure of the annular portion is embedded in the threaded groove. The exterior ring surface of the sealing ribbed plate is provided with a plurality of convex longitudinal ribs. The plurality of convex longitudinal ribs are adjacent to the internal ring surface of the annular portion to provide structural rigidity and to isolate heat transferred from the peripheral portion of the diaphragm.

In the second implementation mode, the force-applying member is an upper valve body. The upper valve body includes a locking screw thread, a shaft hole, one or more annular grooves, a plurality of groove ribbed plates, a diaphragm chamber, and a tightening groove. The tightening groove has a tightening surface. The internal ring surface of the annular portion is provided with an internal screw thread. The locking screw thread is tightly engaged with the internal screw thread. The upper valve body is tightly locked to the internal screw thread. The tightening ring is installed in the tightening groove. An axial distribution position of the ribbed plate structure contains the minimum diameter area and a plurality of screw threads of the external screw thread.

In the third implementation mode based on the second implementation mode, the force-applying member is an upper valve body. The external ring surface of the annular portion is provided with an external screw thread. A plurality of screw threads of the internal screw thread and the external screw thread are overlapped in the axial position. The ribbed plate structure connects the external screw thread. The valve upper cover is provided with an internal screw thread for tightly locking and engaging with the external screw thread of the annular portion. The axial position of the internal screw thread of the annular portion is contained by the axial length of the external screw thread and the ribbed plate structure. When the valve upper cover is tightly locked to the external screw thread, a plurality of screw threads distributed in the axial direction of the internal screw thread of the valve upper cover and the locking screw thread of the upper valve body are overlapped.

In the fourth implementation mode based on the second implementation mode, the force-applying member is an upper valve body. The axial distribution of the ribbed plate structure contains the axial distribution position of the internal screw thread of the annular portion. The external ring surface of the valve upper cover is provided with a plurality of spaced annular ribbed plates.

As to the effect of the sealing mechanism, when the tightening ring is tightened, the tightening ring will be deformed by a force and exert a reaction force on the sealing ribbed plate and the annular portion in the opposite direction. The ribbed plate structure bears the aforementioned reaction force and serves as a support for the annular structure. The annular ribbed plate of the ribbed plate structure is a thick-walled structure with a large outer diameter instead of the thick annular portion, that is, the support arm of the C-shaped fastening structure provides overall structural strength. The force-applying angle c of the force F of the tightening ring can block the movement of the material of the peripheral portion of the diaphragm. The position of the tightening ring is far away from the heat source area and protected by the thermal isolation method. When a high-temperature liquid is transported in a high-temperature environment, the structure of the sealing mechanism will be fully supported to reduce the risk of creep and can pass rigorous tests.

The innovation of the adjusting mechanism is that the transmission of the valve shaft only uses three parts, less than five parts used in the prior art. This can greatly simplify the structure and reduce the manufacturing cost, and can further solve the problems of valve shaft damage (Problem 4) and positional locking (Problem 5), and can find a solution to the position indication (Problem 6), positioning distortion (Problem 7), diaphragm overpressure (Problem 8) and wrong operation (Problem 9), applicable to hollow valve shafts and solid valve shafts.

The adjusting mechanism is installed to the top of the valve upper cover, including the valve shaft, an adjusting seat, a C-shaped retaining ring, an adjusting wheel, a displacement indicator, a positioning nut assembly, a locking nut assembly, and a safety cover.

The adjusting wheel includes a top, an external ring surface, an internal ring surface, and a hub.

The C-shaped retaining ring has an external ring surface, an inner diameter hole, an opening portion, a width B. and a thickness T. Two ends of the opening portion have a pair of tool holes.

The adjusting seat may be integrated with the valve upper cover, or the adjusting seat and the valve upper cover may be individual parts to be tightly locked with bolts. In the best embodiment, they are individual parts, and are in a concentric position via a positioning post.

Each of the positioning nut assembly and the locking nut assembly is composed of two nuts.

The characteristic of the transmission of the valve shaft is described below.

The valve shaft further includes a slide portion, an adjusting screw thread, and a locking screw thread.

The adjusting seat further includes an external ring groove, a tool opening, and a slide hole.

The adjusting wheel further includes an internal ring groove, an adjusting threaded hole, and a tool opening.

The C-shaped retaining ring includes a pair of positioning posts at the two ends of the opening portion, each having a tool hole. The inner side of the positioning post is located on the inner diameter of the inner diameter hole. The radial thickness of the positioning post is not greater than the depth of the tool opening of the adjusting seat.

The C-shaped retaining ring is installed in a groove that is composed of the external ring groove of the adjusting seat and the internal ring groove of the adjusting wheel. The outer diameter of the C-shaped retaining ring is less than the inner diameter of the internal ring groove. The inner diameter of the C-shaped retaining ring is greater than the inner diameter of the external ring groove. The C-shaped retaining ring is configured to axially position the adjusting wheel at an axial fixing position on the adjusting seat.

The positioning post of the C-shaped retaining ring is positioned in the tool opening of the adjusting seat to ensure that the C-shaped retaining ring will not rotate with the adjusting wheel to facilitate maintenance.

The slide portion of the valve shaft is coupled with the slide hole of the adjusting seat to prevent rotation of the valve shaft.

The adjusting screw thread of the valve shaft is coupled with the adjusting threaded hole of the hub, and the adjusting wheel can be rotated to move the valve shaft upward or downward.

The adjusting threaded hole of the hub of the adjusting wheel provides positioning and rotating functions through the C-shaped retaining ring. The slide hole of the adjusting seat provides the anti-rotation function of the valve shaft. Only three parts are used to complete the function of the second type of the transmission of the valve shaft.

The valve shaft safety and locking prevents damage to the valve shaft (Problem 4) and positional locking (Problem 5). The characteristics of the patent are:

The characteristic of the safety and locking of the valve shaft to prevent a damage to the valve shaft (Problem 4) and positional locking (Problem 5) is described below.

The displacement indicator in the form of a gate-shaped strip is installed on the top of the adjusting wheel. The displacement indicator includes a displacement space, a displacement scale, two fixing holes, and a central hole.

The internal ring groove and the external ring groove have the same groove width W. and are slidably fitted with the thickness T of the C-shaped retaining ring. The groove width is W-0.0 mm>=T>=W-0.1 mm. The adjusting wheel can rotate smoothly relative to the adjusting seat.

The locking screw thread of the valve shaft passes through the adjusting threaded hole of the adjusting wheel, and passes through the central hole of the displacement indicator.

At the appropriate opening degree position of the valve, the locking nut assembly tightly locks the valve shaft on the displacement indicator, so that the pipeline pressure wave borne by the valve shaft is transmitted to the adjusting wheel and is transmitted to the valve body structure through the C-shaped retaining ring, preventing the adjusting screw thread of the valve shaft from being damaged by the pipeline pressure wave.

The characteristic of the positioning and return-to-zero of the valve shaft to prevent positioning distortion (Problem 7) and diaphragm overpressure (Problem 8) is described below.

When the diaphragm is properly locked on a valve seat of the valve chamber, the valve is completely closed at this time, which is equivalent to the zero point of the opening degree of the valve. The lower nut of the positioning nut assembly is adjusted and attached to the top of the adjusting wheel, and the positioning nut assembly is fixed on the valve shaft by locking the upper nut tightly. The middle of two nuts of the positioning nut assembly serves as the reference plane for position indication, corresponding to the zero point of the displacement scale. When the valve is closed, the valve shaft moves downward, and the positioning nut assembly is attached to the top of the adjusting wheel to prevent the valve shaft from continuing to move downward and causing overpressure of the diaphragm.

The characteristic of the position indication of the valve shaft (Problem 6) is described below.

The displacement indicator includes a displacement scale for reading the position of the opening degree of the valve. The zeroed joint line between the two nuts of the positioning nut assembly is used as an indicator, and the reading corresponding to the displacement scale is the opening degree of the valve.

Another characteristic of the position indication of the valve shaft (Problem 6) is described below.

The displacement indicator includes a displacement space, two fixing holes, a central hole, a limit bolt, and a locking nut assembly.

The displacement indicator is installed on the top of the valve upper cover of the pneumatic valve. The locking screw thread of the valve shaft passes through a central hole of the valve upper cover and is located in the displacement space of the displacement indicator. A limit bolt and the locking nut assembly are installed in the central hole of the displacement indicator. The height of the tail end of the limit bolt is adjusted, and the locking nut assembly is locked. When the valve is opened, the tail end of the limit bolt will abut against the tail end of the valve shaft. When the pneumatic valve is activated, the opening degree of the valve will be limited to the position of the limit bolt.

The characteristic to prevent a wrong operation of the valve shaft (Problem 9) is described below.

The safety cover includes an inner accommodating chamber, a fixing side, a locking rib, and a locking hole. The fixing side of the safety cover may be installed to the safety seat of the displacement indicator. The inner accommodating chamber of the safety cover covers the entire displacement indicator, so that the locking rib of the safety cover can cooperate with the locking rib of the displacement indicator, and the two communicating locking holes are locked with one lock, which can be opened only by using a key, so as to prevent incorrect operations by an unrelated person. Although the adjusting wheel is not covered, the valve shaft and the displacement indicator are tightly locked together by the locking nut assembly. At this time, the adjusting wheel cannot be operated.

A fluororesin diaphragm valve structure has a cooling gas flow channel. The cooling gas flow channel includes a valve body, a diaphragm, a tightening ring, and a valve shaft. The characteristic of the cooling gas flow channel is described below.

The valve shaft is a hollow shaft and includes a fixing end, a hollow shaft rod, and a plurality of gas guide holes. The valve body includes an annular portion provided with one or more cooling gas holes for introducing an external cooling gas through one or more pipe joints. The cooling gas flows through a cooling gas annular groove provided on the inner side of the annular portion, a plurality of cooling gas guide holes provided on the tightening ring, a diaphragm space on a non-liquid contact side of the diaphragm chamber, and a plurality of vent holes provided on the fixing end of the valve shaft to an axis hole, and then the cooling gas is exhausted from the pipe joint or the axis hole. The method to collect the vapor of the leaked liquid as a leakage warning (Problem 10) is to connect a collection pipe detection system from the cooling gas hole or connect a collection pipe from the tail end of the valve shaft for detection, which also meets the requirements of operating temperature (Problem 1).

BRIEF DESCRIPTION OF THE DRAWINGS

FIG. 1E is a schematic view of the C-shaped tightening mechanism of the diaphragm valve according to an embodiment of the present invention;

FIG. 2B is a cross-sectional view of the valve shaft of the diaphragm valve according to an embodiment of the present invention;

FIG. 2B' is a perspective view of the valve shaft of the diaphragm valve according to an embodiment of the present invention;

FIG. 2C' is a perspective view of the adjusting seat of the diaphragm valve according to an embodiment of the present invention;

FIG. 2D' is a perspective view of the adjusting wheel of the diaphragm valve according to an embodiment of the present invention;

FIG. 2E' is a cross-sectional view of the C-shaped retaining ring of the diaphragm valve according to an embodiment of the present invention;

FIG. 3C is a cross-sectional view of the valve upper cover of the manual valve 1a according to an embodiment of the present invention;

FIG. 3C' is a perspective view of the valve upper cover of the manual valve 1a according to an embodiment of the present invention;

FIG. 4C is a cross-sectional view of the upper valve body of the normally closed pneumatic valve 1d according to an embodiment of the present invention;

FIG. 4C' is a perspective view of the upper valve body of the normally closed pneumatic valve 1d according to an embodiment of the present invention:

FIG. 4D is a cross-sectional view of the valve shaft assembly of the normally closed pneumatic valve 1d according to an embodiment of the present invention;

FIG. 4D' is a perspective view of the valve shaft assembly of the normally closed pneumatic valve 1d according to an embodiment of the present invention;

FIG. 5C' is a perspective view of the valve upper cover and the adjusting seat of the manual diaphragm valve having the upper valve body according to an embodiment of the present invention:

FIG. 5F' is a perspective view of the valve shaft assembly of the normally closed pneumatic valve 1d according to an embodiment of the present invention;

FIG. 5F" is another perspective view of the valve shaft assembly of the normally closed pneumatic valve 1d according to an embodiment of the present invention;

FIG. 7A is a schematic view of the normally open pneumatic valve 1e for enhancing thermal isolation according to a fifth embodiment of the present invention;

DETAILED DESCRIPTION OF THE PREFERRED EMBODIMENTS

Figure 1A:
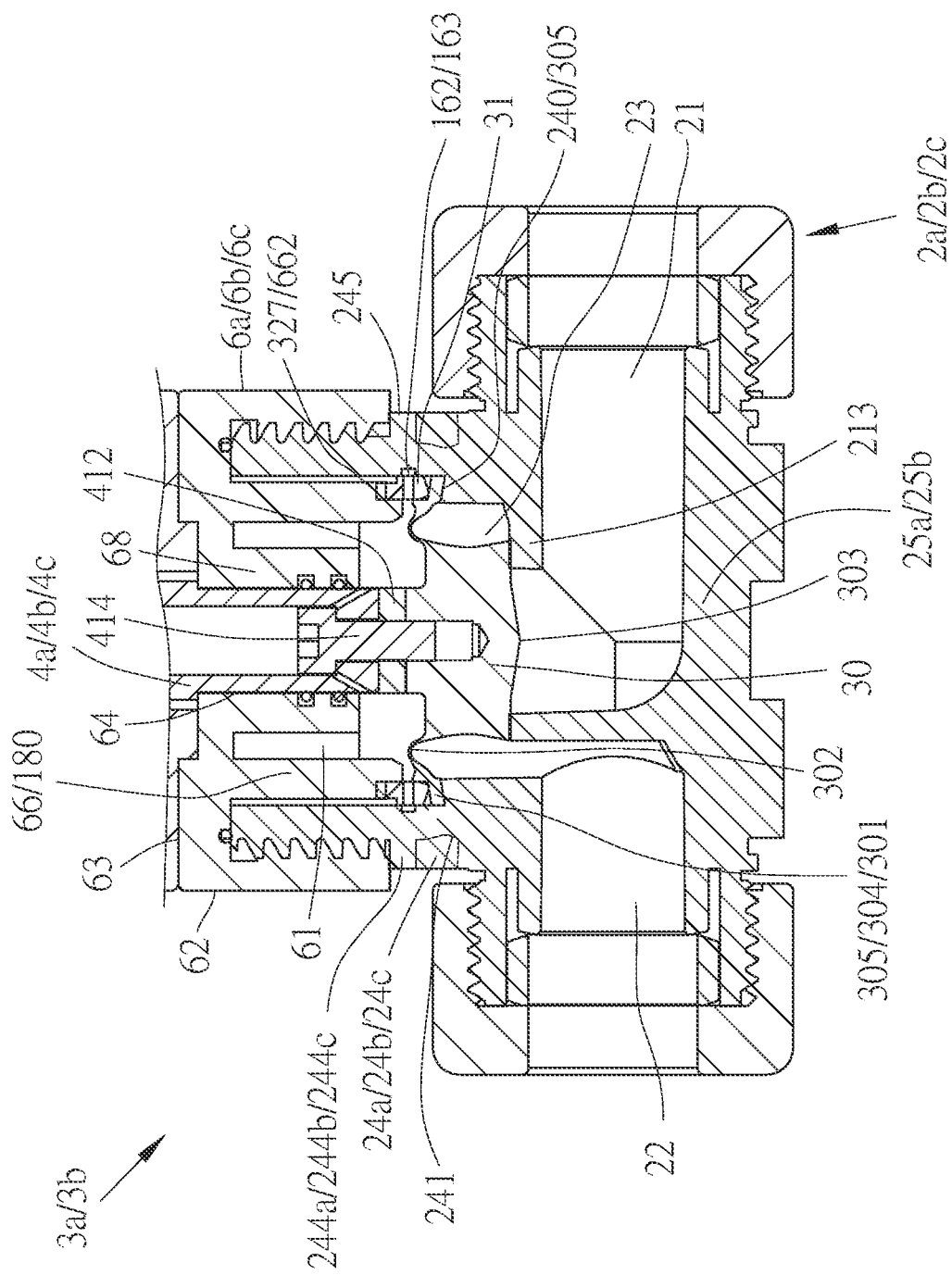
FIG. 1A is a detailed schematic view of the sealing mechanism of the diaphragm valve according to an embodiment of the present invention.

Embodiments of the present invention will now be described, by way of example only, with reference to the accompanying drawings.

The present invention takes a manual diaphragm valve as an example, illustrating a sealing mechanism 3 (referring to FIG. 1A) and an adjusting mechanism 7 (referring to FIG. 2A) of a manual valve 1a. In a first embodiment, referring to FIG. 3A, the manual valve 1a has a valve upper cover 6a. The valve upper cover 6a has a sealing ribbed plate 66. The sealing ribbed plate 66 serves as a force-applying member and has the sealing mechanism 3a. In a second embodiment, referring to FIG. 4A, the adjusting mechanism 7 is modified to a limit mechanism and applied to a normally closed pneumatic valve 1d. The normally closed pneumatic valve 1d has a sealing mechanism 3b and an upper valve body 32. The upper valve body 32 serves as the force-applying. The limit mechanism includes a displacement indicator 76, a limit bolt 70, and a safety cover 79. In a third embodiment, referring to FIG. 5A, the independent adjusting mechanism 7 is applied to a normally closed pneumatic valve 1b. The normally closed pneumatic valve 1b has a sealing mechanism 3b and an upper valve body 32. The upper valve body 32 serves as the force-applying member. In a fourth embodiment, referring to FIG. 5B, the adjusting mechanism 7 is integrally installed with the valve upper cover, as a normally closed pneumatic valve 1c. A fifth embodiment describes an enhanced thermal isolation mechanism of a normally open pneumatic valve 1e. The normally open pneumatic valve 1e has a sealing mechanism 3b and an upper valve body 32. The upper valve body 32 serves as the force-applying member. A sixth embodiment describes a cooling gas flow channel 16. The following implementations will be described in further detail.

For all the descriptions, please refer to FIG. 1A, FIG. 1B, FIG. 1C, FIG. 1D, FIG. 1E. FIG. 2A, FIG. 2B, FIG. 2B', FIG. 2C, FIG. 2C', FIG. 2D, FIG. 2D', FIG. 2E, FIG. 2E', FIG. 2F, FIG. 2G, FIG. 3A, FIG. 3B, FIG. 3C. FIG. 3C', FIG. 4A, FIG. 4B, FIG. 4C, FIG. 4C', FIG. 4D, FIG. 4D', FIG. 4E, FIG. 5A, FIG. 5B, FIG. 5C, FIG. 5C', FIG. 5D, FIG. 5E, FIG. 5F, FIG. 5F', FIG. 5F'", FIG. 6, FIG. 7A, FIG. 7B, FIG. 7C, FIG. 7D, FIG. 8, and FIG. 9.

The following takes the basic mode and the first implementation mode as the main example and includes different embodiments of the second implementation mode, the third implementation mode and the fourth implementation mode. Different numerals represent structural adjustments. For example, the ribbed plate structure 244a/244b/244c means that there are three implementation modes of a ribbed plate structure 244, marked with three numerals 244a, 244b, 244c, all of which achieve the same effect.

For a sealing mechanism 3a/3b, the following takes the basic mode and the first implementation mode as the main example.

Figure 2A:
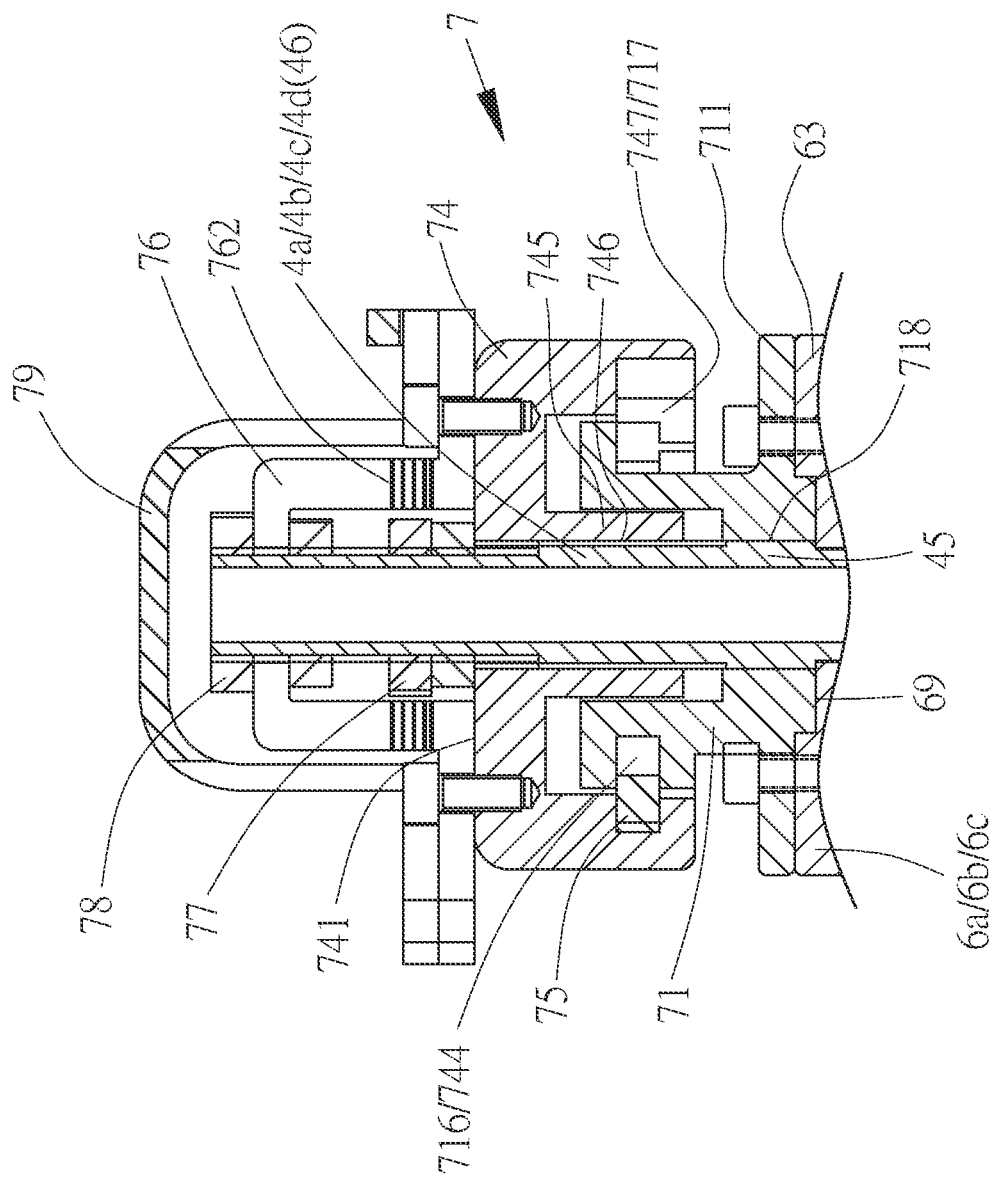
FIG. 2A is a detailed schematic view of the manual adjusting device of the diaphragm valve according to an embodiment of the present invention (the adjusting mechanism is a separate member)

Referring to FIG. 1A, the sealing mechanism 3a/3b includes a diaphragm 30, a tightening ring 31, a tightening surface 327/662, a sealing surface 240, an annular portion 24a/24b/24c, and a ribbed plate structure 244a/244b/244c. The sealing mechanism 3a/3b is based on a valve body 2a/2b/2c as the main structure. The valve body 2a/2b/2c includes an inlet 21, an outlet 22, a valve chamber 23, the annular portion 24a/24b/24c, and a square portion 25a/25b.

The annular portion 24a/24b/24c is an open cup-shaped structure and is sealed by a valve upper cover 6a/6b/6c, and includes the sealing surface 240, an external ring surface 245, a minimum diameter area 241, the valve chamber 23, and the ribbed plate structure 244a/244b/244c. The sealing surface 240 is disposed on the outer edge of the valve chamber 23. A square portion 25a/25b is provided under the valve chamber 23 and coupled with the valve chamber 23 to provide a support. The ribbed plate structure 244a/244b/

244c is located on the external ring surface 245 of the annular portion 24a/24b/24c. The annular portion 24a/24b/24c further includes one or more cooling gas hole 162 and a cooling gas annular groove 163.

The valve upper cover 6a/6b/6c includes an inner accommodating chamber 61, an external ring surface 62, a top 63, a central hole 64, and a sealing ribbed plate 66. The tightening face 662/327 is derived from the force-applying member, parts or structures of other valve structures. For example, the force-applying member is the sealing ribbed plate 66 or an upper valve body 32. These parts or structures will be tightly locked with the annular portion 24a/24b/24c.

The ribbed plate structure 244a/244b/244c is an annular latticed structure with a plurality of horizontal openings. One side of the ribbed plate structure 244a/244b/244c in the axial direction is connected with the square portion 25a/25b, and the distribution position contains the minimum diameter area 241. The other side of the ribbed plate structure 244a/244b/244c in the axial direction contains the tightening ring 31.

The ribbed plate structure 244a/244b/244c is composed of one or more spaced annular ribbed plates and a plurality of spaced vertical ribbed plates. The plurality of vertical ribbed plates are axially connected to all the annular ribbed plates through the square portion 25a/25b.

Figure 1C:
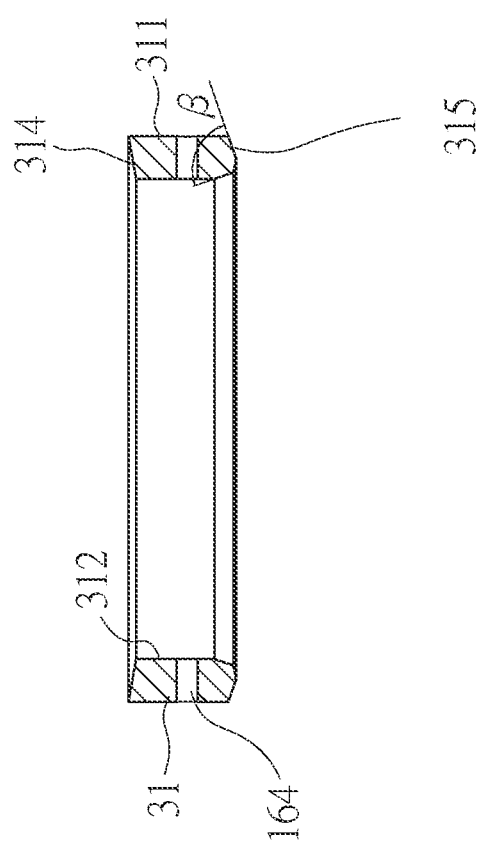
FIG. 1C is a schematic view of the tightening ring of the diaphragm valve according to an embodiment of the present invention.
Figure 1B:
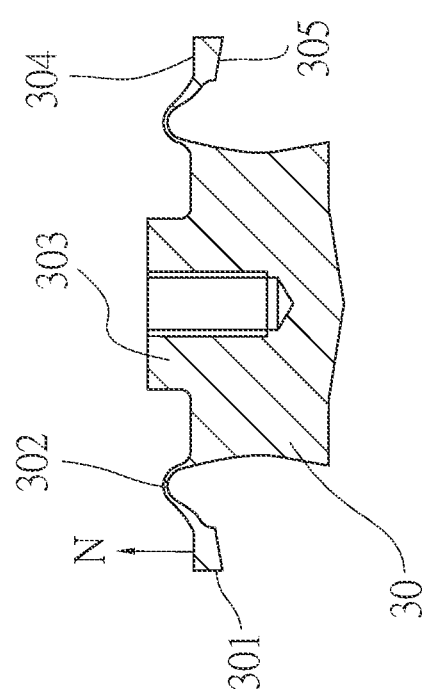
FIG. 1B is a schematic view of the diaphragm of the diaphragm valve according to an embodiment of the present invention.

Referring to FIG. 1B, the diaphragm 30 includes a peripheral portion 301, an elastic portion 302, and a central portion 303. The peripheral portion 301 includes upper and lower side surfaces. The upper side surface is defined as a force-receiving surface 304, and the lower side surface is defined as a fitting surface 305.

Referring to FIG. 1C, the tightening ring 31 is an annular structure with an approximately rectangular cross-section, and has two ends defined as a force-receiving end 314 and a tightening end 315. The tightening end 315 is an obtuse angle β, and in the best embodiment, $110° \leq \beta \leq 150°$.

Figure 1D:
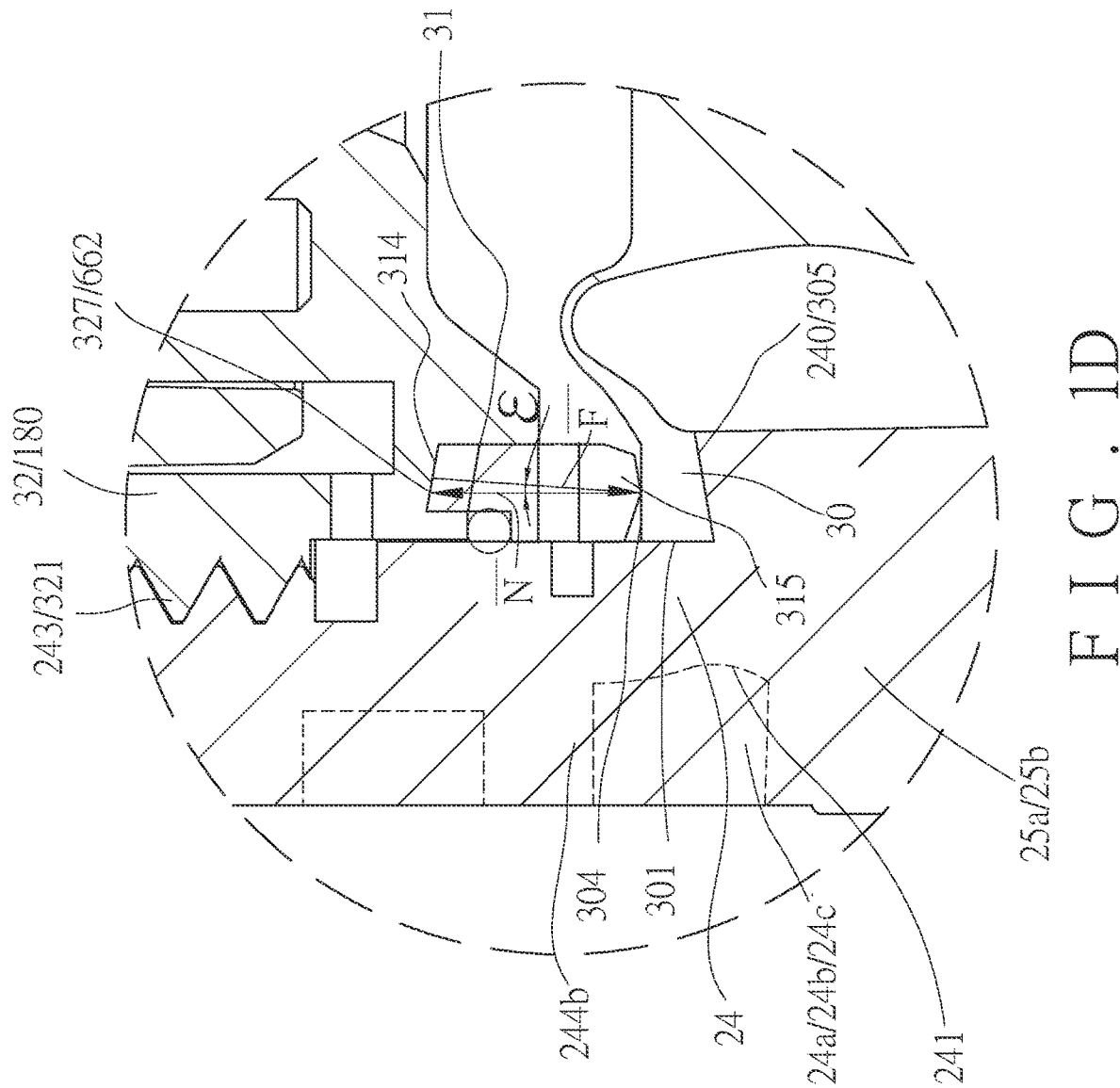
FIG. 1D is a schematic view of the sealing surface and the force-applying angle of the diaphragm valve according to an embodiment of the present invention.

Referring to FIG. 1D, when the diaphragm 30 is expanded and deformed under the pressure of the pipeline, the peripheral portion 301 will be applied with a force and pulled to generate a displacement. The peripheral portion 301 has a wedge-shaped cross-section, with a greater thickness on its outer side and a less thickness on its inner side connected to the elastic portion. The peripheral portion 301 includes upper and lower side surfaces. The upper side surface is defined as the force-receiving surface 304, and the lower side surface is defined as the fitting surface 305. The fitting surface 305 and the force-receiving surface 304 are mutually non-planar surfaces or conical surfaces. The fitting surface 305 is attached to the sealing surface 240 of the annular portion 24a/24b/24c. The force-receiving surface 304 will be pressed tightly by the tightening end 315 of the tightening ring 31. The sealing surface 240 may be a conical surface or a planar surface.

Referring to FIG. 1A and FIG. 2B, the valve shaft 4a/4b/4c is a hollow shaft, including a fixing end 41 and a shaft rod 42. The fixing end 41 has a plurality of gas guide holes 413 and a bolt hole 411. The fixing end 41 may be installed with a bolt 414 and a nut 412 to lock the diaphragm 30 tightly. The valve shaft 4a/4b/4c and the diaphragm 30 can rotate relative to each other. The tightening ring 31 is installed on the peripheral portion 301 of the diaphragm. The diaphragm 30 is mounted on the sealing surface 240 of the annular portion 24a/24b/24c together with the axis.

Referring to FIG. 1D, when locked, the tightening surface 327/662 and the force-receiving end 314 slide, and a tightening force F is applied to the force-receiving end 314, so that the tightening end 315 having an obtuse angle β (referring to FIG. 1C) can be stationary and tightened on the peripheral portion 301. When the sealing surface 240 is tightened by the force F, it is supported by the ribbed plate structure 244a/244b/244c of the annular portion 24a/24b/24c, and is supported by the square portion 25a/25b and the flow channel side wall of the valve chamber 23. The tightening force F has a force-applying angle ε with the normal line N of the peripheral portion 301, and the force-applying angle c is in the range $0° < \varepsilon \leq 15°$. The tightening ring 31 is deformed by the force and applies a force to the peripheral portion 301 of the diaphragm 30. At the same time, the sealing surface 240 to which the peripheral portion 301 is attached is also applied with the force. The structure of the minimum diameter area 241 and the square portion 25a/25b below the sealing surface 240 also provides a support. The minimum diameter area 241 has a heat transfer restriction area to reduce heat transfer.

Referring to FIG. 1E, the tightening surface 327/662 connects the annular portion 24a/24b/24c to the sealing surface 240 to form a C-shaped tightening structure 18. A tightening portion 181 of the C-shaped tightening structure 18 includes the force-applying member 66. In the figure, the force-applying member is a sealing ribbed plate 66 of a valve upper cover 6a, and the force-applying member 66 is tightly locked to the annular portion 24a/24b/24c. A support arm 182 of the C-shaped tightening structure 18 provides overall structural strength for the annular portion 24a/24b/24c and the ribbed plate structure 244a/244b/244c. A base 183 of the C-shaped tightening structure 18 is the sealing surface 240, which is supported by the minimum diameter area 241, the flow channel side wall of the valve chamber 23 and the ribbed plate structure 244a/244b/244c. The tightening surface 327/662 is moved downward by locking tightly, so that the tightening ring 31 and the diaphragm 30 are clamped by the tightening surface 327/662 and the sealing surface 240 to prevent leakage.

Please refer to FIG. 2A. An adjusting mechanism 7 will be implemented in different embodiments. Different numerals represent different structural adjustments, which all achieve the same adjustment effect for the opening degree of the valve. The adjusting mechanism 7 can be bolted to the top 63 of a valve cover 6a/6b/6c, and includes the valve shaft 4a/4b/4c/4d, an adjusting seat 71, an adjusting wheel 74, a displacement indicator 76, a positioning nut assembly 77, a locking nut assembly 78, and a safety cover 79. Each of the positioning nut assembly 77 and the locking nut assembly 78 is composed of two nuts.

Please refer to FIG. 2B and FIG. 2B', illustrating the valve shaft 4a/4b/4c/4d. The valve shaft 4a further includes a slide portion 45, an adjusting screw thread 46, and a locking screw thread 47. The slide portion 45 is an axle having a pair of parallel cut-out sides.

Figure 2C:
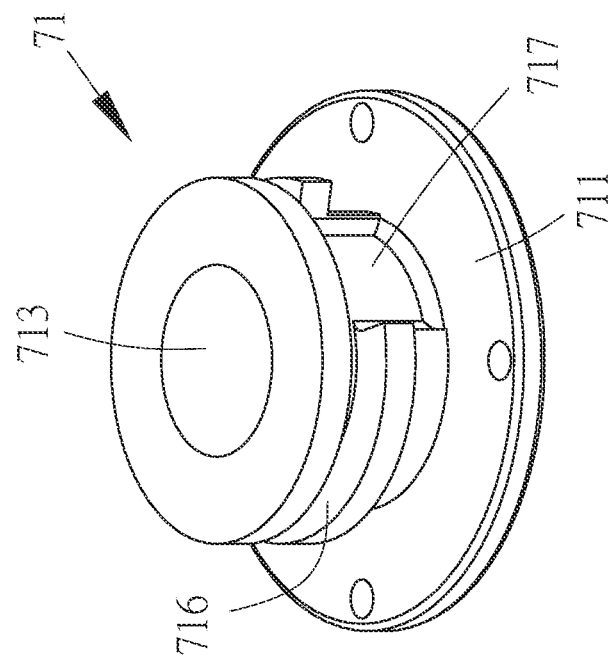
FIG. 2C is a cross-sectional view of the adjusting seat of the diaphragm valve according to an embodiment of the present invention.
Figure 2C:
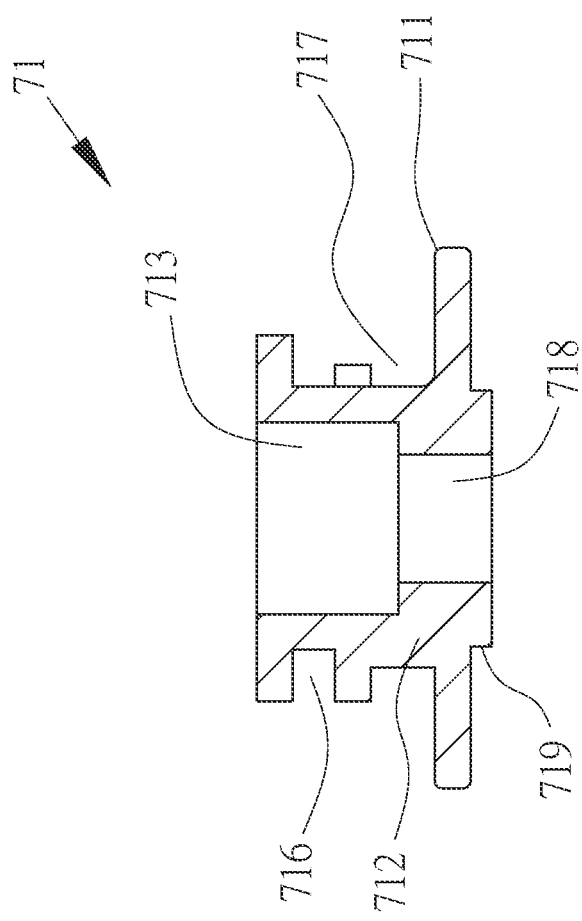
Figure 3A:
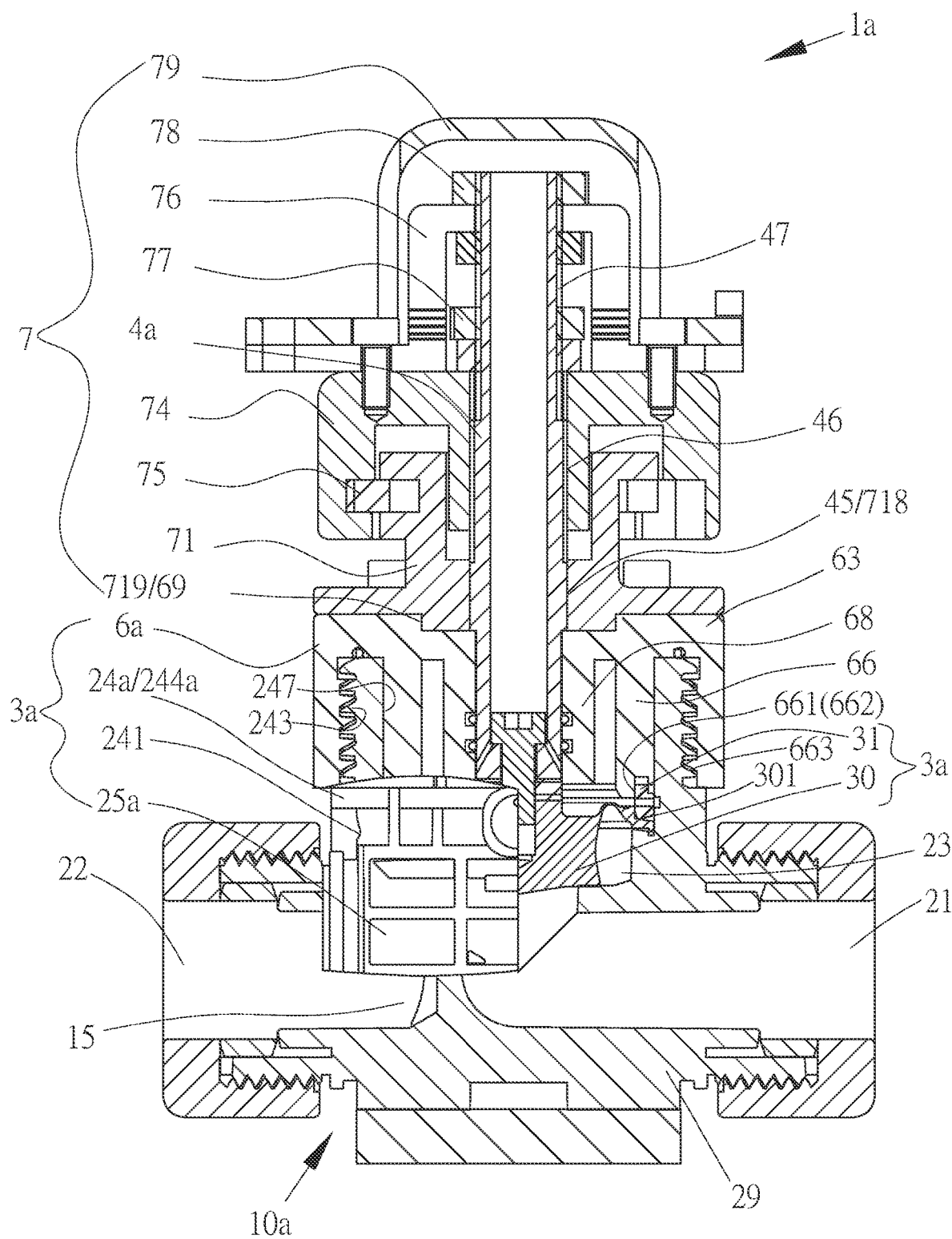
FIG. 3A is a schematic view of the manual valve 1a for enhancing thermal isolation according to a first embodiment of the present invention.

Please refer to FIG. 2C and FIG. 2C'. The adjusting seat 71 includes a shoulder 711, a neck 712, an internal space 713, an external ring groove 716, a tool opening 717, and a slide hole 718. The adjusting seat 71 may be integrated with the valve upper cover 6a/6b/6c, or the adjusting seat 71 and the valve upper cover 6a/6b/6c may be individual parts to be tightly locked with bolts. In the best embodiment, they are individual parts. The adjusting seat 71 includes a positioning post 719 to be coupled to a positioning hole 69 (referring to FIG. 2A) of the valve upper cover 6a/6b/6c, so as to ensure the concentric positioning of the valve shaft 4a/4b/4c. The adjusting seat 71 is provided with a plurality of bolt holes (not shown) to be tightly locked to a plurality of threaded holes (not shown) of the valve upper cover.

Figure 2D:
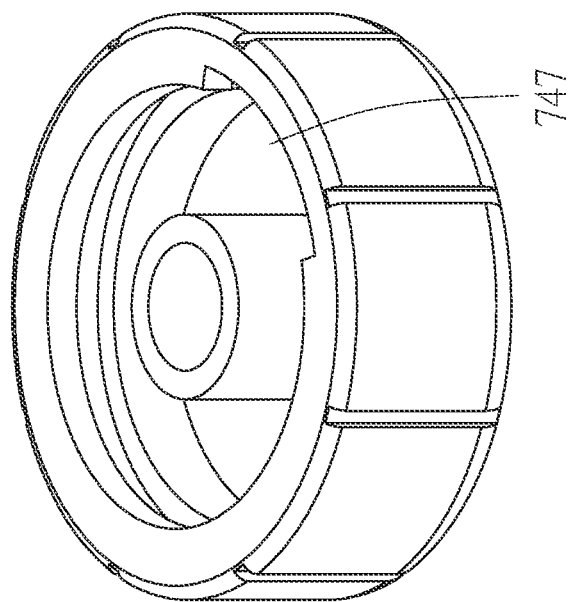
FIG. 2D is a cross-sectional view of the adjusting wheel of the diaphragm valve according to an embodiment of the present invention.
Figure 2D:
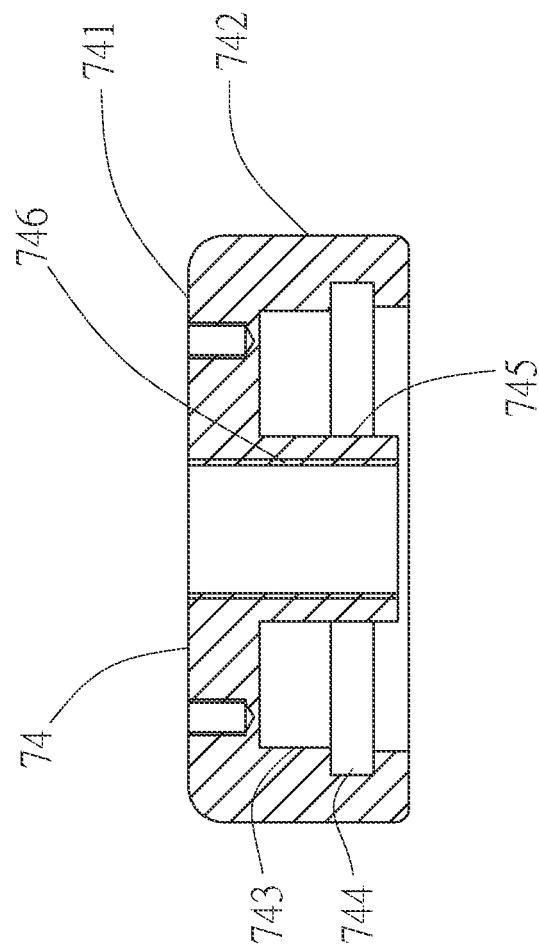

Please refer to FIG. 2D and FIG. 2D'. The adjusting wheel 74 includes a top 741, an external ring surface 742, an internal ring surface 743, an internal ring groove 744, a hub 745, an adjusting threaded hole 746, and a tool opening 747.

Figure 2E:
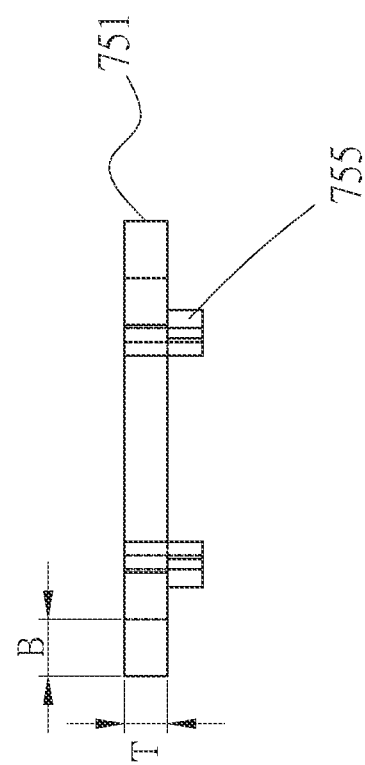
FIG. 2E is a top view of the C-shaped retaining ring of the diaphragm valve according to an embodiment of the present invention.
Figure 2E:
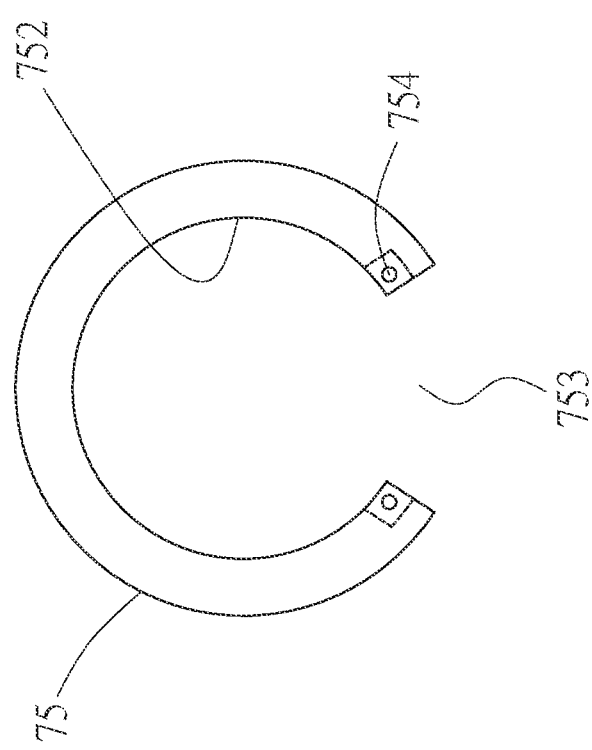

Please refer to FIG. 2E and FIG. 2E'. A C-shaped retaining ring 75 has an external ring 751, an inner diameter hole 752, an opening portion 753, two tool holes 754, a width B, and a thickness T. Two ends of the opening portion 753 have the tool holes 754. The inner side of a positioning post 755 is located on the inner diameter of the inner diameter hole 752. The radial thickness of the positioning post 755 is not greater than the depth of the tool opening 717 of the adjusting seat 71.

Figure 2G:
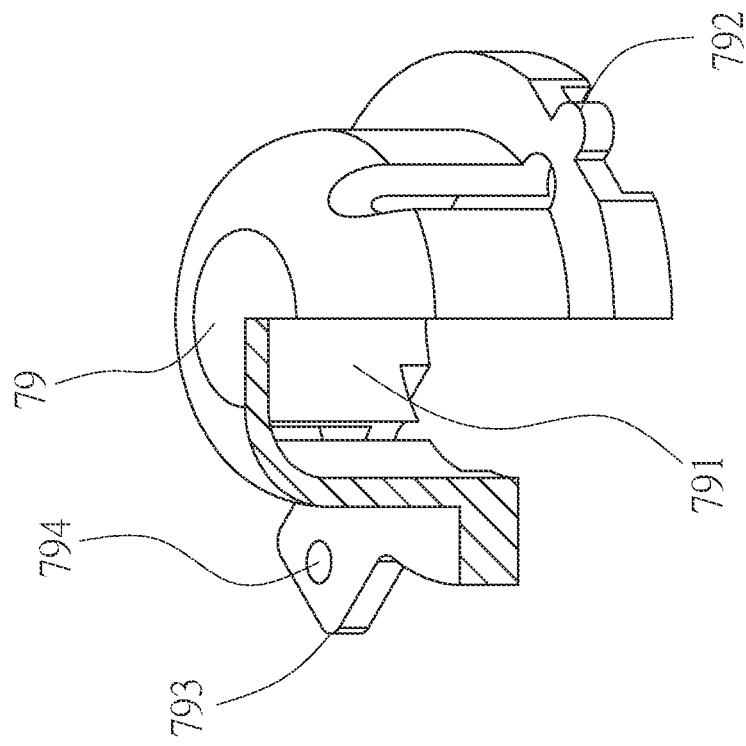
FIG. 2G is a schematic view of the safety cover of the diaphragm valve according to an embodiment of the present invention.
Figure 2F:
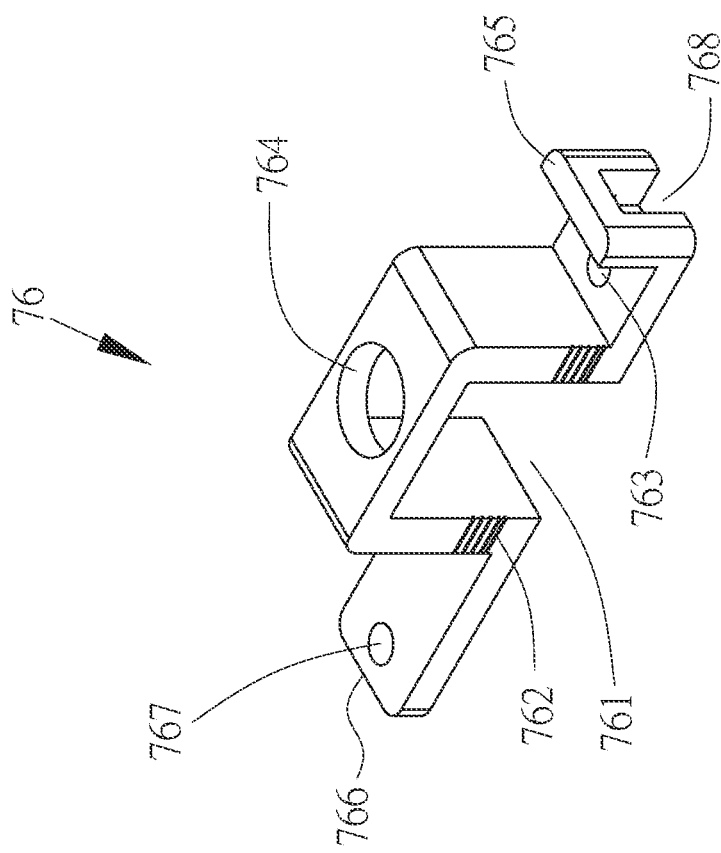
FIG. 2F is a schematic view of the displacement indicator of the diaphragm valve according to an embodiment of the present invention.

Please refer to FIG. 2F. The displacement indicator 76 in the form of a gate-shaped strip is installed on the top 741 of the adjusting wheel 74. The displacement indicator 76 includes a displacement space 761, a displacement scale 762, two fixing holes 763, and a central hole 764.

Please refer to FIG. 2F and FIG. 2G. The adjusting mechanism 7 may be installed with the safety cover 79. The safety cover 79 includes an inner accommodating chamber 791, a fixing side 792, a locking rib 793, and a locking hole 794. The displacement indicator 76 further includes a safety seat 765, a locking rib 766, and a locking hole 767. The fixing side 792 of the safety cover 79 may be installed to the safety seat 765 having a notch 768 of the displacement indicator 76. The inner accommodating chamber 791 of the safety cover 79 covers the entire displacement indicator 76, so that the locking rib 793 of the safety cover 79 can cooperate with the locking rib 766 of the displacement indicator 76, and the two communicating locking holes 767, 794 are locked with one lock, which can be opened only by using a key, so as to prevent incorrect operations by an unrelated person. Although the adjusting wheel 74 is not covered, the valve shaft 4a and the displacement indicator 76 are tightly locked together by the locking nut assembly 8 (as shown in FIG. 2A). At this time, the adjusting wheel 74 cannot be operated.

Please refer to FIG. 2A. The slide portion 45 of the valve shaft 4a/4b/4c/4d is coupled with the slide hole 718 of the adjusting seat 71 to prevent rotation of the valve shaft 4a/4b/4c/4d. The adjusting screw thread 46 of the valve shaft 4a/4b/4c/4d is coupled with the adjusting threaded hole 746 of the hub 745, and the adjusting wheel 74 can be rotated to move the valve shaft 4a/4b/4c/4d upward or downward. The locking screw thread 46 of the valve shaft 4a/4b/4c/4d passes through the adjusting threaded hole 746 of the adjusting wheel 74 and the central hole 764 of the displacement indicator 76.

Please refer to FIG. 1A and FIG. 2A. When the diaphragm 30 is properly locked on the valve seat 231 of the valve chamber 23, the valve is completely closed at this time, which is equivalent to the zero point of the opening degree of the valve. The lower nut of the positioning nut assembly 77 is adjusted and attached to the top 741 of the adjusting wheel 74, and the positioning nut assembly 77 is fixed on the valve shaft 4a/4b/4c/ by locking the upper nut tightly. The middle of two nuts of the positioning nut assembly 77 serves as the reference plane for position indication, corresponding to the zero point of the displacement scale 762 of the displacement indicator 76. When the valve is closed, the valve shaft 4a/4b/4c/4d moves downward, and the positioning nut assembly 77 is attached to the top 741 of the adjusting wheel 74 to prevent the valve shaft 4a/4b/4c/4d from continuing to move downward and causing overpressure of the diaphragm 30.

At the position of an appropriate opening degree of the valve, the locking nut assembly 78 tightly locks the valve shaft 4a/4b/4c/4d on the displacement indicator 76, so that the pipeline pressure wave borne by the valve shaft 4a/4b/4c/4d is transmitted to the adjusting wheel 74 and is transmitted to the valve body structure through the C-shaped retaining ring, preventing the adjusting screw thread 46 of the valve shaft 4a/4b/4c/4d from being damaged by the pipeline pressure wave.

The displacement indicator 76 includes the displacement scale 762 for reading the position of the opening degree of the valve. The zeroed joint line between the two nuts of the positioning nut assembly 77 is used as an indicator, and the reading corresponding to the displacement scale 762 is the opening degree of the valve.

The C-shaped retaining ring 75 is installed in a groove that is composed of the external ring groove 716 of the adjusting seat 71 and the internal ring groove 744 of the adjusting wheel 74. The outer diameter of the C-shaped retaining ring 75 is less than the inner diameter of the internal ring groove 744. The inner diameter of the C-shaped retaining ring 75 is greater than the inner diameter of the external ring groove 716. The C-shaped retaining ring 75 is configured to axially position the adjusting wheel 74 at an axial fixing position on the adjusting seat 71.

The internal ring groove 744 and the external ring groove 716 have the same groove width W, and are slidably fitted with the thickness T of the C-shaped retaining ring 75. The groove width is W-0.0 mm>=T>=W-0.1 mm. The adjusting wheel 74 can rotate smoothly relative to the adjusting seat 71, and the pipeline pressure wave is transmitted to the annular portion 24a/24b/24c via the valve shaft 4a/4b/4c/4d.

The positioning post 755 of the C-shaped retaining ring 75 is positioned in the tool opening 717 of the adjusting seat 71 to ensure that the C-shaped retaining ring 75 will not rotate with the adjusting wheel 74 to facilitate maintenance, referring to FIG. 2E and FIG. 2E'.

The adjusting threaded hole 746 of the hub 745 of the adjusting wheel 74 provides positioning and rotating functions through the C-shaped retaining ring 75. The slide hole 718 of the adjusting seat 71 provides the function to stop rotation of the valve shaft 4a/4b/4c/4d. Only three parts are used to complete the function of the second type of the transmission of the valve shaft.

In the first embodiment, referring to FIG. 3A, the manual valve 1a includes a sealing mechanism 3a, an adjusting mechanism 7 and a valve portion 10a. The sealing mechanism 3a is explained based on the first implementation mode. The valve portion 10a includes a valve body 2a, a valve upper cover 6a, the diaphragm 30, the tightening ring 31, and a valve shaft 4a.

Figure 3B:
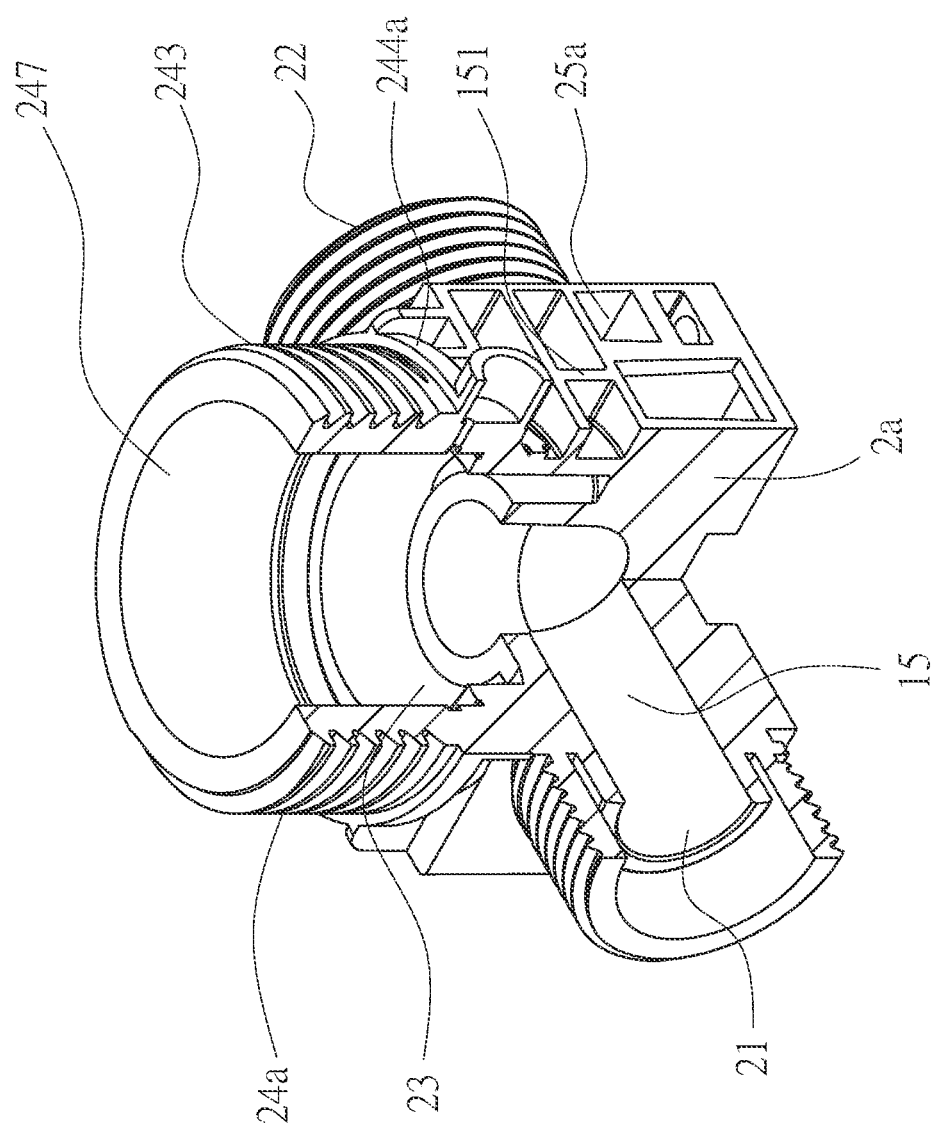
FIG. 3B is a schematic view of the valve body and the annular portion of the manual valve 1a according to an embodiment of the present invention.

Please refer to FIG. 3A and FIG. 3B. The valve body 2a includes the inlet 21, the outlet 22, the valve chamber 23, an annular portion 24a, and a square portion 25a. The outlet 22, the inlet 21 and the valve chamber 23 are the fluid flow space for conveying liquid, as a heat source area 15. Both the annular portion 24a and the square portion 25a have a heat transfer restriction structure 151. The annular portion 24a further includes an external screw thread 243 and an internal ring surface 247. The valve shaft 4a passes through a central hole 64 of the shaft hub portion 68 of the valve upper cover 6a, so that the valve upper cover 6a can be tightly locked to the external screw thread 243 of the annular portion 24a.

Please refer to FIG. 3A, FIG. 3B and FIG. 3C. The valve upper cover 6a further includes a shaft hub portion 68 and a central hole 64. The valve upper cover 6a further includes the axially annular sealing ribbed plate 66 located between the shaft hub portion 68 and the internal screw thread 65, a threaded groove 663 located between the annular sealing ribbed plate 66 and the internal screw thread 65, and a shaft hub groove 664 located between the shaft hub portion 68 and the annular sealing ribbed plate 66. The lower end of the annular sealing ribbed plate 66 is formed with an annular tightening groove 661. The opening of the groove faces the threaded groove 663 and faces downward. A tightening surface 662 is provided at the upper bottom of the tightening groove 661. The tightening ring 31 is installed in the annular tightening groove 661. A plurality of radial ribs 683 are connected between the annular sealing ribbed plate 66 and the shaft hub portion 68 to provide higher rigidity of the sealing ribbed plate 66 and to isolate the heat transferred from the valve shaft 4a. The exterior ring surface of the sealing ribbed plate 66 is provided with a plurality of convex longitudinal ribs 665. The plurality of convex longitudinal ribs 665 are adjacent to the internal ring surface 247 of the annular portion 24a to provide structural rigidity and to isolate the heat transferred from the peripheral portion 301 of the diaphragm 30.

As shown in FIG. 3A, the structural support of the sealing mechanism 3a includes the annular portion 24a, the diaphragm 30, the tightening ring 31, the ribbed plate structure 244a, and the valve upper cover 6a. The other side of the ribbed plate structure 244a in the axial direction is connected to the external screw thread 243. When the valve upper cover 6a is tightly closed by the annular portion, the structure of the annular portion 24a will be embedded in the threaded groove 663.

As shown in FIG. 3A, the adjusting mechanism 7 is installed on the top 63 of the valve upper cover 6a, and is coupled to the positioning hole 69 of the valve upper cover 6a via the positioning post 719 of the adjusting seat 71. The adjusting mechanism 7 includes the valve shaft 4a, the adjusting seat 71, the adjusting wheel 74, the displacement indicator 76, the positioning nut assembly 77, the locking nut assembly 78, and the safety cover 79.

Figure 4A:
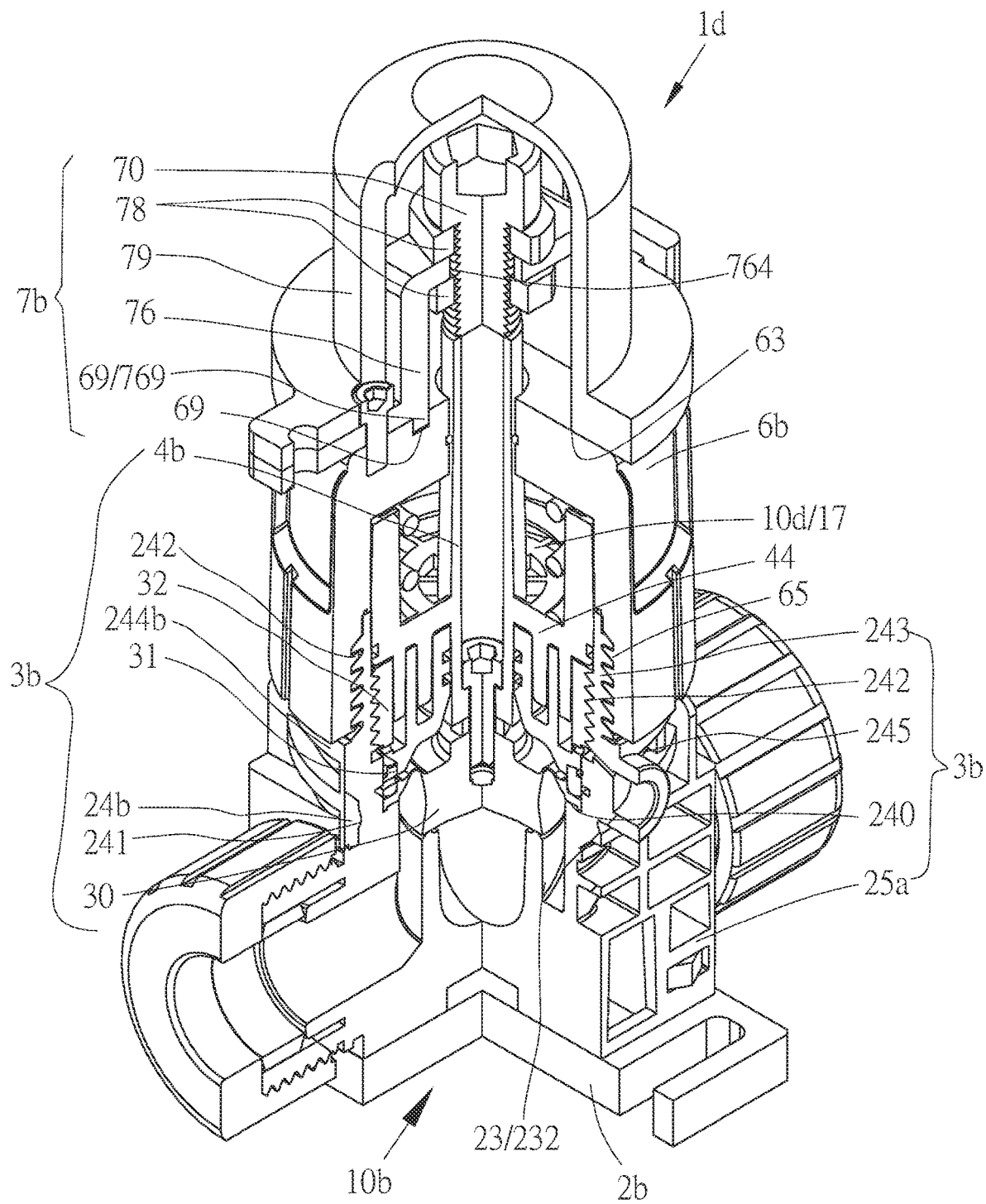
FIG. 4A is a schematic view of the normally closed pneumatic valve 1d according to a second embodiment of the present invention.

In the second embodiment, referring to FIG. 4A, FIG. 4D and FIG. 4D', the displacement indicator 76 is applied to a normally closed pneumatic valve 1d having a sealing mechanism 3b. The sealing mechanism 3b is described based on the second implementation mode and third implementation mode, and the displacement indicator 76 has the function to limit the opening degree.

The normally closed pneumatic valve 1d includes a valve portion 10b, a driving cylinder 10d, the sealing mechanism 3b, and the displacement indicator 76. The valve portion 10b includes a valve body 2b, the diaphragm 30, the tightening ring 31, the upper valve body 32, and the valve shaft 4b. The driving cylinder 10d is a cylinder space 17 airtight from the upper valve body 32 to the valve upper cover 6b. The piston 44 of the valve shaft 4b divides the space into a gas space 171 and a spring space 172. A set of springs is installed in the upper spring space 172 to keep the diaphragm 30 normally closed. The lower gas space 171 is introduced with high-pressure air to open the diaphragm 30. The opening degree of the valve can be set via the adjusting mechanism 7. The valve upper cover 6b further includes an internal screw thread 65, a displacement height H (referring to FIG. 5A), and a positioning hole 69.

Figure 4B:
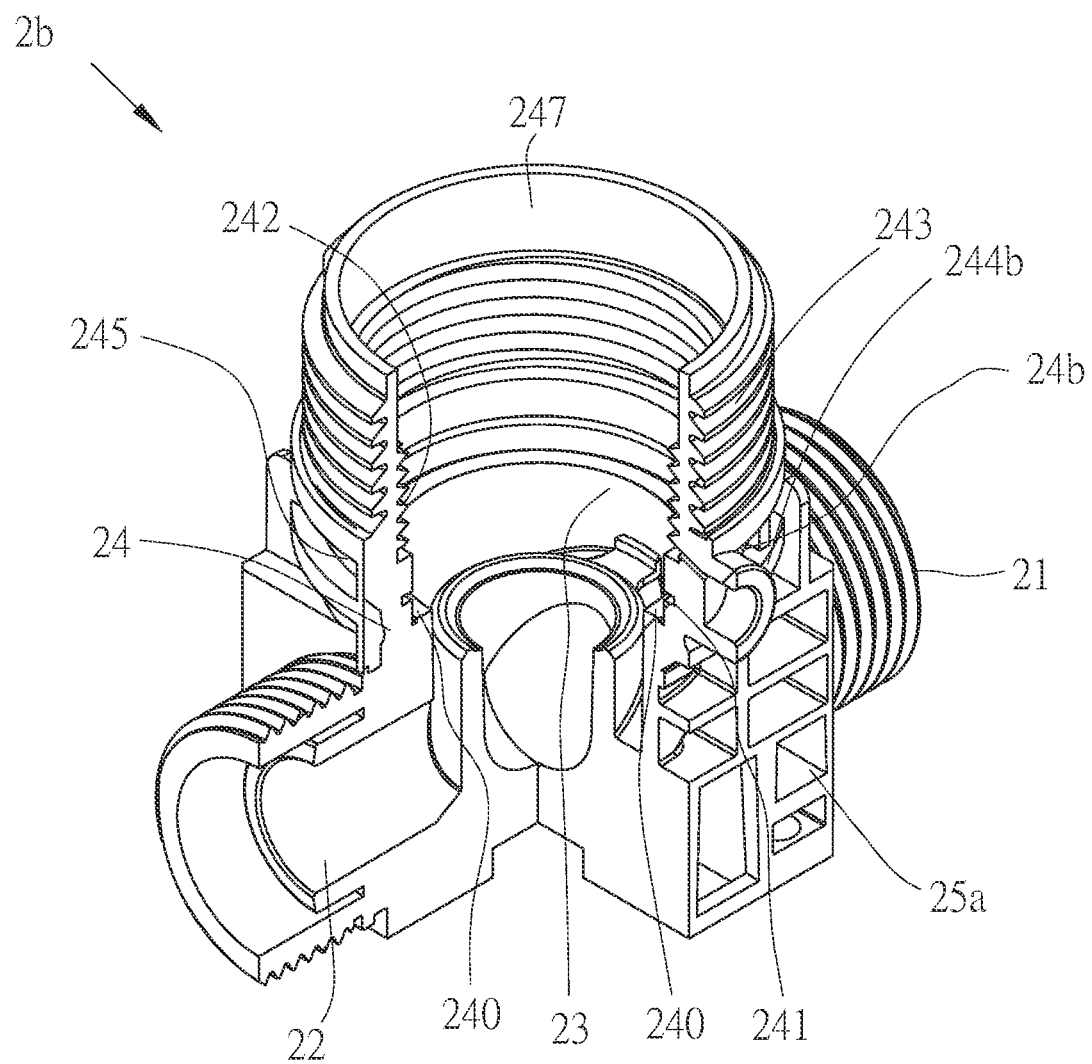
FIG. 4B is a perspective sectional schematic view of the valve body of the normally closed pneumatic valve 1d according to an embodiment of the present invention.

Referring to FIG. 4B, the valve body 2b includes the inlet 21, the outlet 22, the valve chamber 23, an annular portion 24b, and a square portion 25a. The annular portion 24b further includes an internal screw thread 242, an external screw thread 243, the ribbed plate structure 244b, and an internal ring surface 247.

Referring to FIG. 4C and FIG. 4C', the upper valve body 32 includes a locking screw thread 321, a tightening groove 322, a shaft hole 323, one or more annular grooves 324, a plurality of groove ribbed plates 325, a diaphragm chamber 326, and the tightening surface 327.

Referring to FIG. 4D and FIG. 4D', the valve shaft 4b is a hollow shaft, including the fixing end 41, the hollow shaft rod 42, the plurality of gas guide holes 413, and the piston 44. The piston 44 is located at the middle of the valve shaft 4b. The piston 44 has a disc shape and includes a plurality of vertical ribbed plates 442 and one or more annular ribbed plates 441. The annular ribbed plate 441 is coupled with the annular groove 324 of the upper valve body 32. The vertical ribbed plates 442 are configured to apply a torsion force to lock the upper valve body 32 tightly.

Figure 4E:
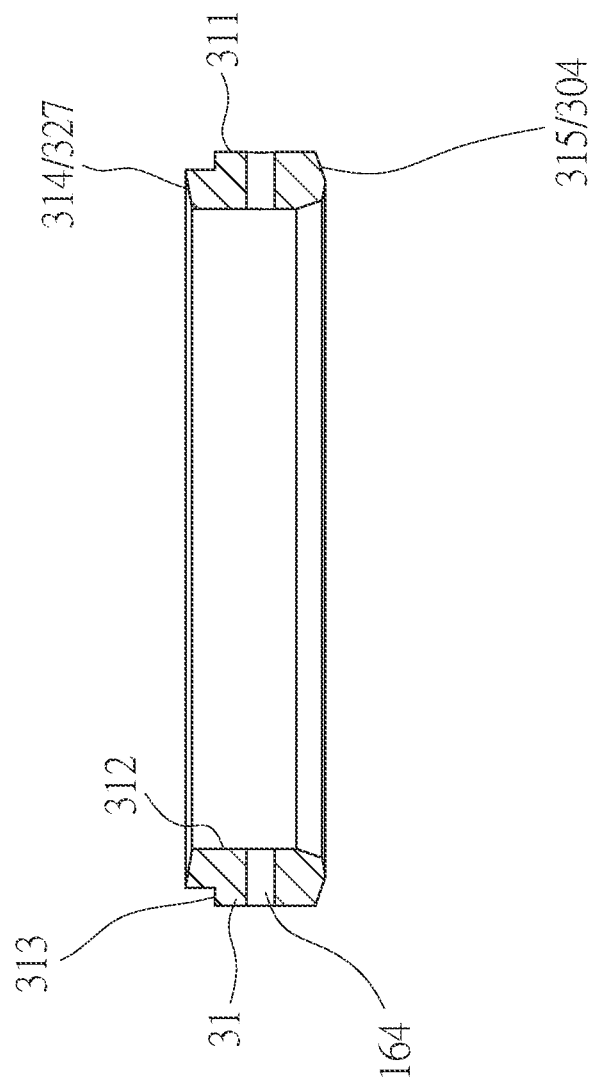
FIG. 4E is a schematic view of the tightening ring having a groove of the normally closed pneumatic valve 1d according to an embodiment of the present invention.

Referring to FIG. 4D, FIG. 4D' and FIG. 4E, the tightening ring 31 is installed in the tightening groove 322 of the upper valve body 32. The force-receiving end 314 is connected to the tightening surface 327, and an O-ring groove 313 is provided on the exterior ring side of the force-receiving end 314. The tightening end 315 is joined to the force-receiving surface 304. When the locking screw thread 321 of the upper valve body 32 is tightly engaged with the internal screw thread 242 of the annular portion 24b (referring to FIG. 4A), the tightening surface 327 of the annular groove 324 applies a force F to the force-receiving end 314, so that the tightening end 315 having an obtuse angle β is pressed against the force-receiving surface 304.

Referring to FIG. 4A, the sealing mechanism 3b includes the annular portion 24b, the diaphragm 30, the tightening ring 31, the ribbed plate structure 244b, and the upper valve body 32. When the upper valve body 32 is tightly locked to the internal screw thread 242 and pressed against the tightening ring 31, the sealing mechanism 3b is supported by external ring side of the sealing surface 240 and the ribbed plate structure 244b. The lower side of the sealing surface 240 is supported by the square portion 25a and the side wall of the flow channel 232 of the valve chamber 23, and also includes the structure near the minimum diameter area 241.

The sealing mechanism 3b and the external screw thread are disposed on the external ring surface 245 of the annular portion 24b, and the sealing mechanism 3b is located below the external screw thread 243. The axial distribution position of the ribbed plate structure 244b contains the minimum diameter area 241 and a plurality of screw threads of the internal screw thread 242. The other side of the ribbed plate structure 244b in the axial direction is connected to the external screw thread 243 to increase the structural strength and heat dissipation effect of the sealing mechanism 3b. The internal screw thread 242 and the external screw thread 243 of the annular portion 24b have a plurality of threads overlapping in the axial position. That is, the axial position distribution of the internal screw thread 242 is covered by the axial length of the outer screw thread 243 and the ribbed plate structure 244. When the valve upper cover 6b is tightly locked with the external screw thread 243 of the annular portion 24b, the valve upper cover 6b will also provide additional structural support for the upper valve body 32.

Referring to FIG. 4A, the displacement indicator 76 is installed on the top 63 of the valve upper cover 6b. The bottom of the displacement indicator 76 is provided with two positioning posts 769 coupled with the positioning hole 69 of the valve upper cover 6b. The displacement indicator 76 further includes a limit bolt 70, the locking nut assembly 78, and the safety cover 79.

The limit bolt 70 is first installed with the locking nut assembly 78, and passes through the central hole 764 of the displacement indicator 76. The locking nut assembly 78 is installed from the tail end of the limit bolt until the tail end of the limit bolt 70 reaches a required height. The height is also in line with the height of the valve shaft 4b to be moved upward. At this time, the limit bolt 70 is tightly locked with the locking nut assembly 78. When the high pressure gas is introduced into the driving cylinder 10d, the tail end of the valve shaft 4b will be blocked by the limit bolt 70. The safety cover 79 is configured to protect the displacement indicator 76.

Figure 5A:
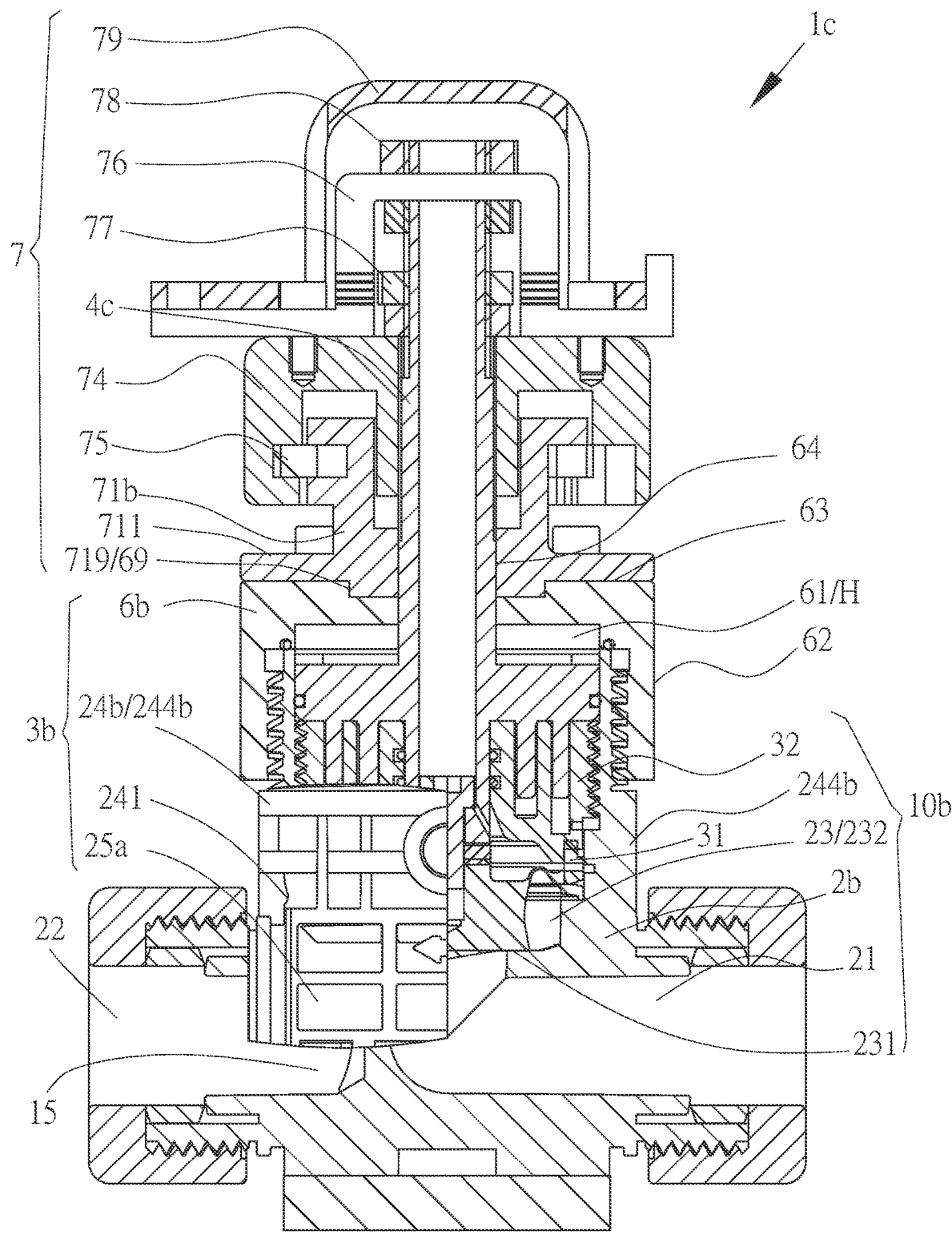
FIG. 5A is a structural schematic view of the manual diaphragm valve 1b having the upper valve body according to a third embodiment of the present invention.

The third embodiment, referring to FIG. 5A, is changed from the second embodiment to a manual valve 1b. The sealing mechanism 3a is explained based on the second implementation mode and the third implementation mode. The manual valve 1b no longer has the driving cylinder 10d, but still has the sealing mechanism 3b and the adjusting mechanism 7. The manual valve 1b is composed of the valve portion 10b, the sealing mechanism 3b and the adjusting mechanism 7. The valve portion 10b includes the valve body 2b, the valve shaft 4c, the upper valve body 32, the diaphragm 30, the tightening ring 31, and the valve upper cover 6b. The valve upper cover 6b has a displacement height H.

The adjusting mechanism 7 is installed on the top 63 of the valve upper cover 6b. The shoulder 711 of the adjusting seat 71 has a plurality of round holes to facilitate the locking of the adjusting mechanism 7. After the sealing mechanism 3b is tightly locked, the valve shaft 4c will no longer rotate.

Figure 5B:
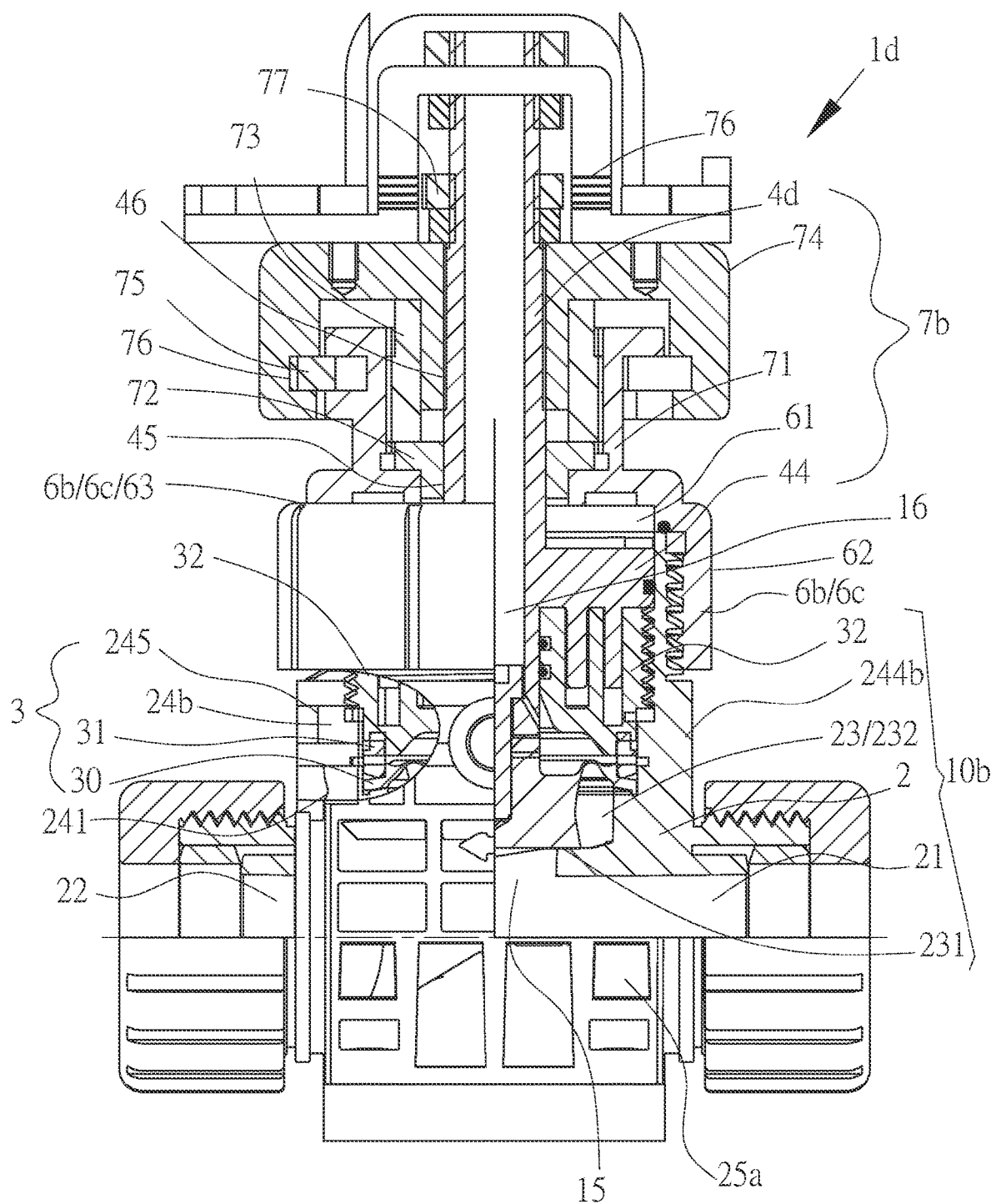
FIG. 5B is a structural schematic view of the manual diaphragm valve 1c having the upper valve body according to a fourth embodiment of the present invention.
Figure 5C:
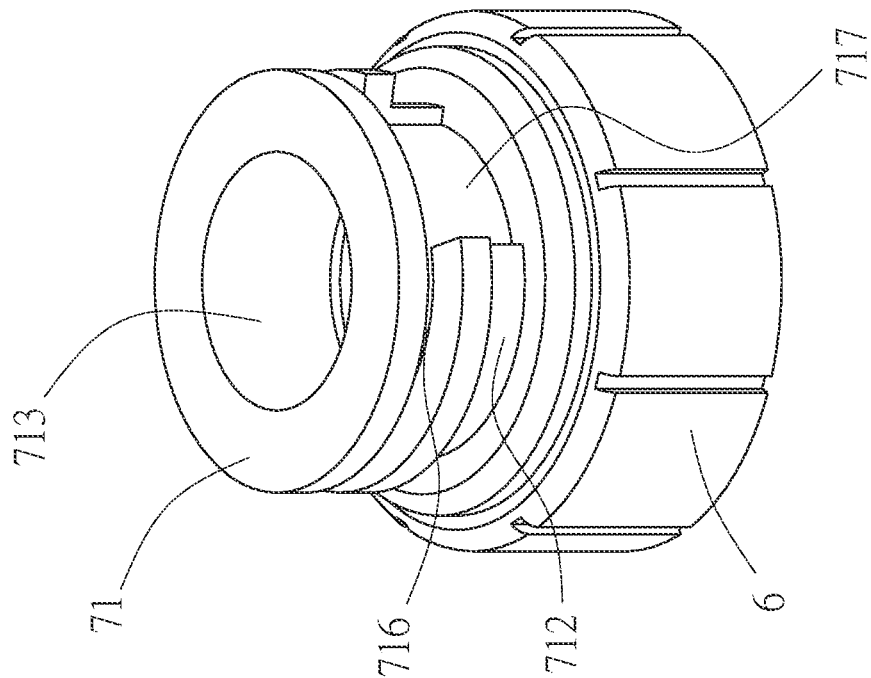
FIG. 5C is a cross-sectional view of the valve upper cover and the adjusting seat of the manual diaphragm valve having the upper valve body according to an embodiment of the present invention.
Figure 5C:
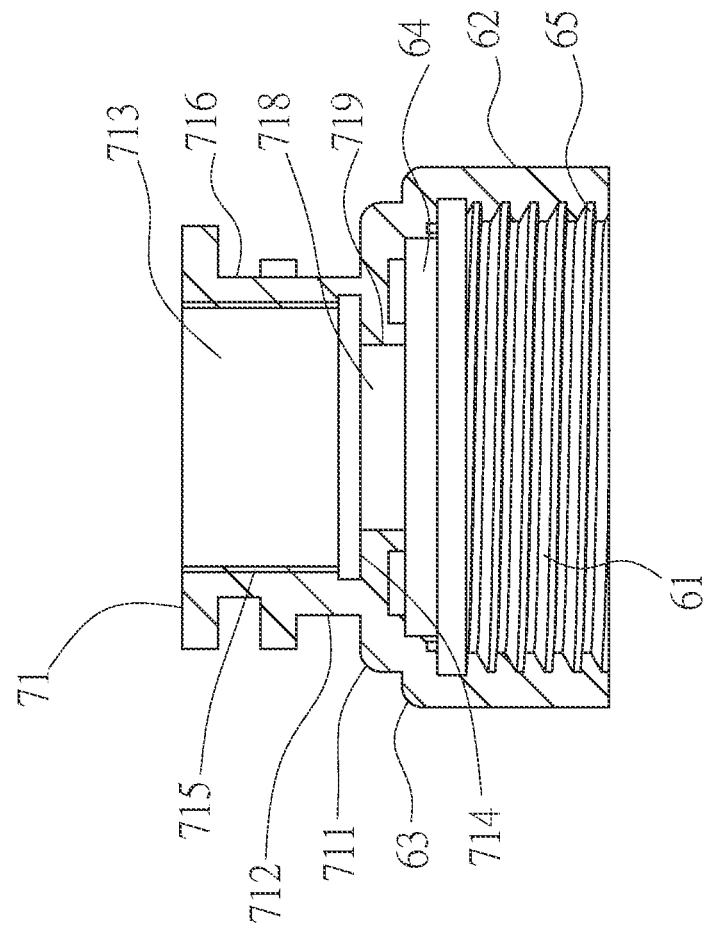
Figure 5E:
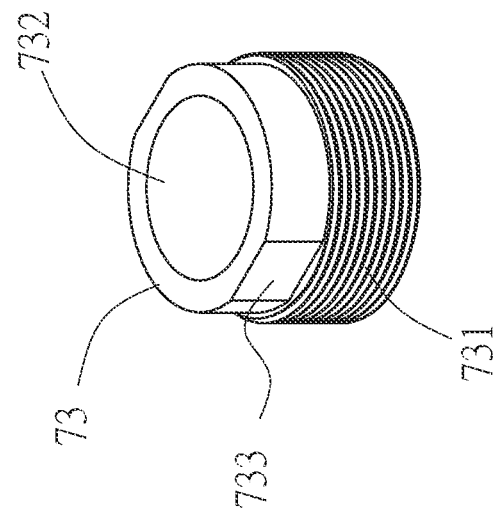
FIG. 5E is a schematic view of the locating screw sleeve of the manual diaphragm valve having the upper valve body according to an embodiment of the present invention.
Figure 5D:
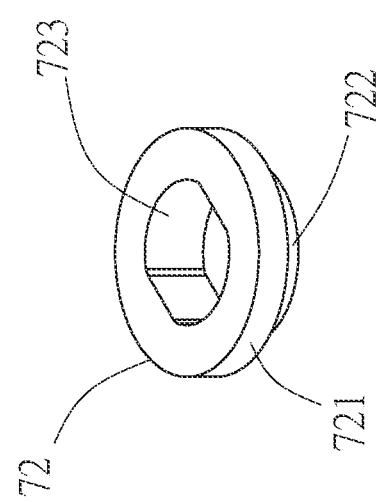
FIG. 5D is a schematic view of the locating ring of the manual diaphragm valve having the upper valve body according to an embodiment of the present invention.
Figure 5F:
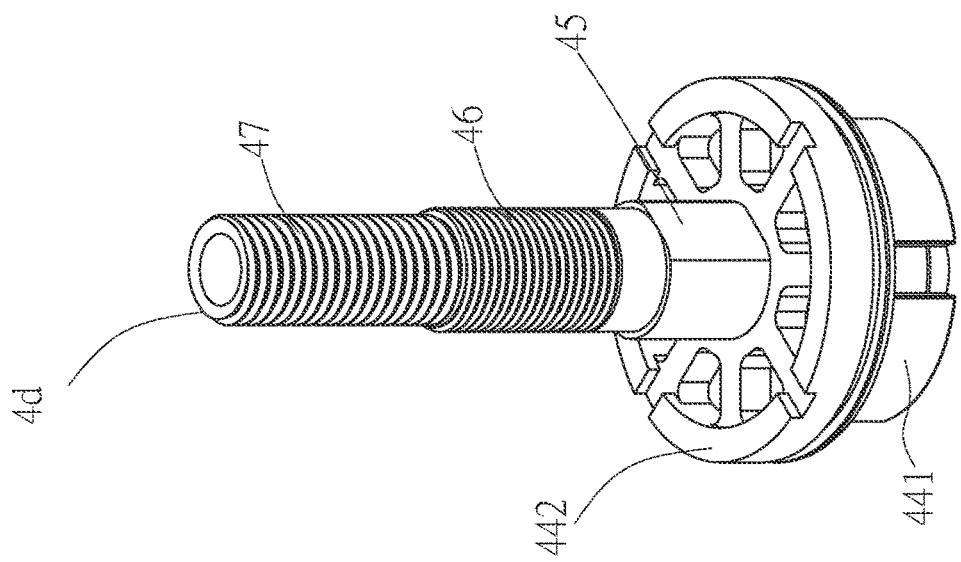
FIG. 5F is a cross-sectional view of the valve shaft assembly of the normally closed pneumatic valve 1d according to an embodiment of the present invention.
Figure 5F:
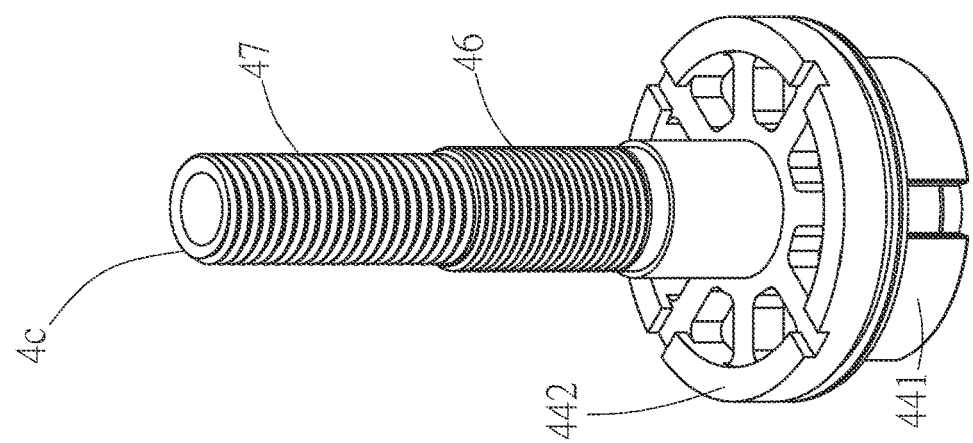
Figure 5F:
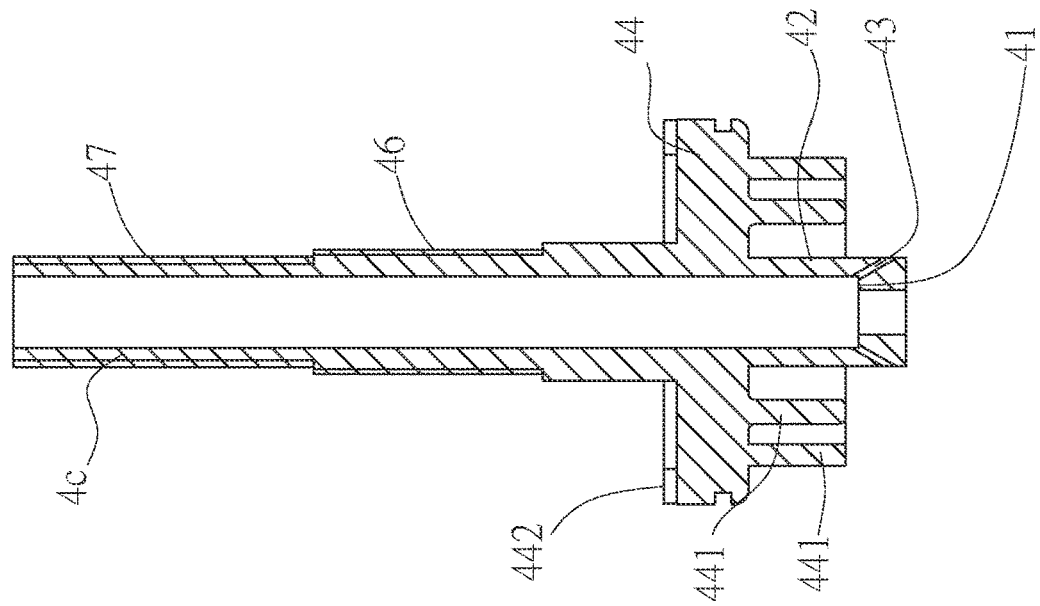

Referring to FIG. 5F, there is no need for the valve shaft 4c to have the slide portion 45 and for adjusting seat 71 to have the slide hole 718. The valve shaft 4c can be inserted through the central hole 64 of the valve cover 6b to close the annular portion 24b. The valve shaft 4c and the central hole 64 will not interfere with rotation. The positioning post 719 of the adjusting seat 71 is coupled with the positioning hole 69 of the valve upper cover 6b, so that the adjusting mechanism 7 is mounted on the valve shaft 4c. When the adjusting wheel 74 is turned to open the diaphragm, the valve shaft 4c will rotate upward until the vertical ribbed plate 442 on the upper side of the piston 44 has completed its stroke H and will touch the top of the inner accommodating chamber 61 of the valve upper cover 6b.

The fourth embodiment, referring to FIG. 5B, is changed from the third embodiment to a manual valve 1b. The adjusting seat 71 of the adjusting mechanism 7 of the manual valve 1c is integrally with the valve upper cover 6b, and the other components of the sealing mechanism 3b are still used. Because the adjusting seat 71 of this embodiment is integrated with the valve upper cover 6b, after the valve portion 10b is assembled with the sealing mechanism 3b, the valve shaft 4d cannot be inserted through the central hole 64 of the valve upper cover 6b and then through the slide hole 718. Because this will cause the valve shaft 4d to rotate and drive the annular ribbed plate 441 of the piston 44 (referring to FIG. 5F. FIG. 5F and FIG. 5F'') to rotate the locked upper valve body 32, causing a rotation interference of the rotating shaft.

Please refer to FIG. 5C and FIG. 5C'. The solution is to install a locating seat 714 and a locating screw thread 715 in an internal space 713 of an adjusting seat 71, and a locating ring 72 and a locating screw sleeve 73 (referring to FIG. 5B) are provided, instead of the slide hole 718 of the adjusting seat 71.

Referring to FIG. 5D, the locating ring 72 includes a flange 721, an external ring surface 722, and an elongate hole 723.

Referring to FIG. 5E, the locating screw sleeve 73 includes an external screw thread 731, a central hole 732, and a twisting portion 733.

Referring to FIG. 5B, FIG. 5C, FIG. 5C' FIG. 5D and FIG. 5E, one end of the valve shaft 4d passes through the central hole 64 of the valve upper cover 6b, the valve upper cover 6b can be tightly locked to the external screw thread 243 of the annular portion 24b, and then the locating ring 72 can be installed on the locating seat 714. The outer diameter of the flange 721 of the locating ring 72 is greater than the central hole 64. The external ring surface 722 is slidably fitted with the central hole 64 to achieve an axis positioning function. The elongate hole 723 cooperates with the slide portion 45 of the valve shaft 4d. After the locating screw sleeve 73 is tightly locked in the locating screw hole 715 via the tightening portion 733, the locating ring 72 is fixed and the valve shaft 4d cannot be rotated. Then, the C-shaped retaining ring 75 is installed to the external groove 716 with a tool, and then the adjusting wheel 74 is installed.

Figure 6:
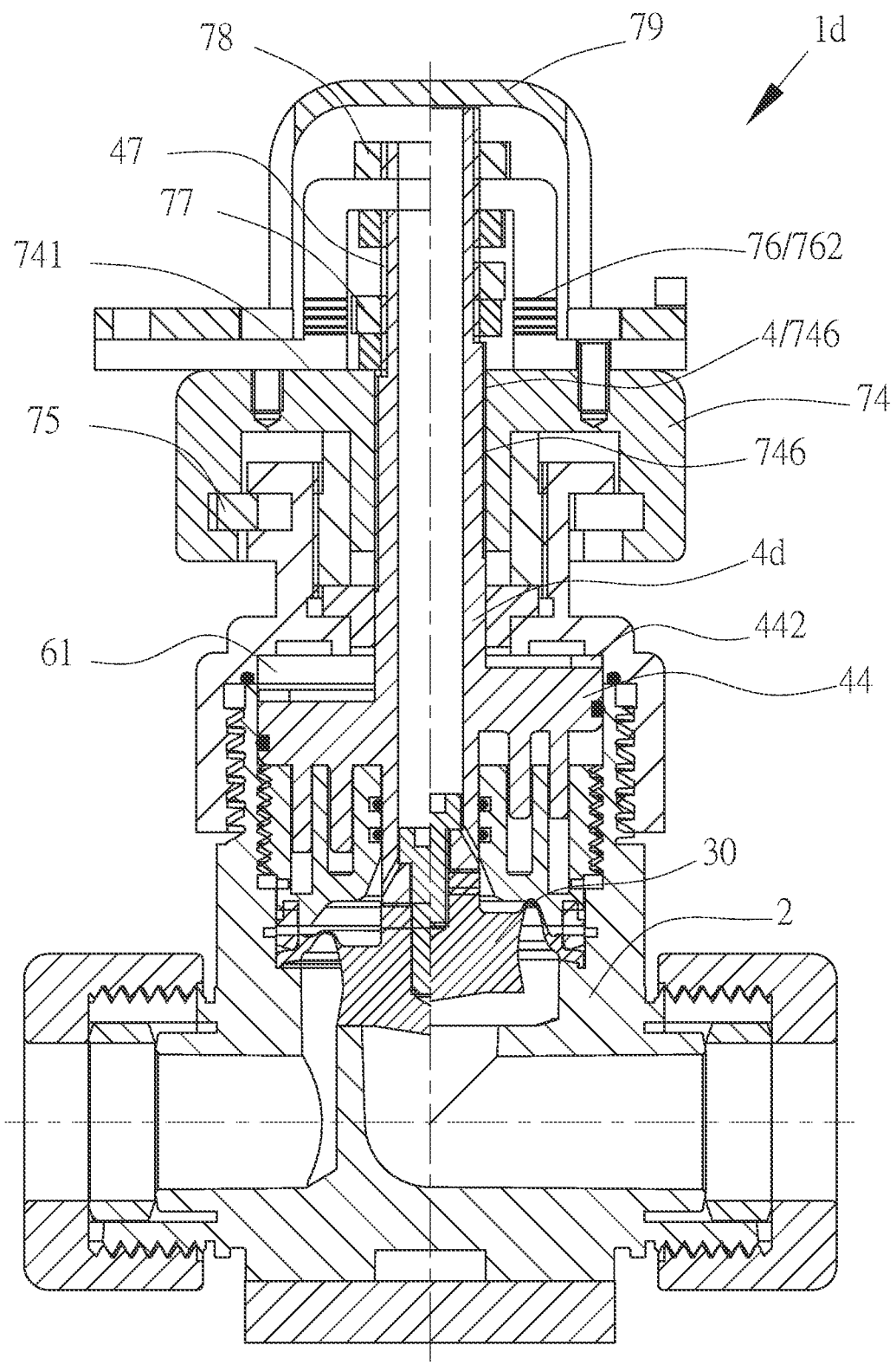
FIG. 6 is a schematic view showing that all the valves of the diaphragm valve are opened according to an embodiment of the present invention.

Please refer to FIG. 6, which is a comparison view of the fully open/closed valve of the manual valve 1c of the fourth embodiment.

The fifth embodiment, referring to FIG. 7A, is changed from the second embodiment to a normally open pneumatic valve 1e. The sealing mechanism 3b is explained based on the second implementation mode and the fourth implementation mode, illustrating the structure for further improving the heat dissipation capability. The normally open pneumatic valve 1e includes a driving cylinder 10d, a valve portion 10c, and a sealing mechanism 3b. The driving cylinder 10d has a heat dissipation enhancing structure. The driving cylinder 10d and the valve portion 10c are tightly locked with four metal bolts passing through four bolt posts 13 to be airtight.

Figure 7B:
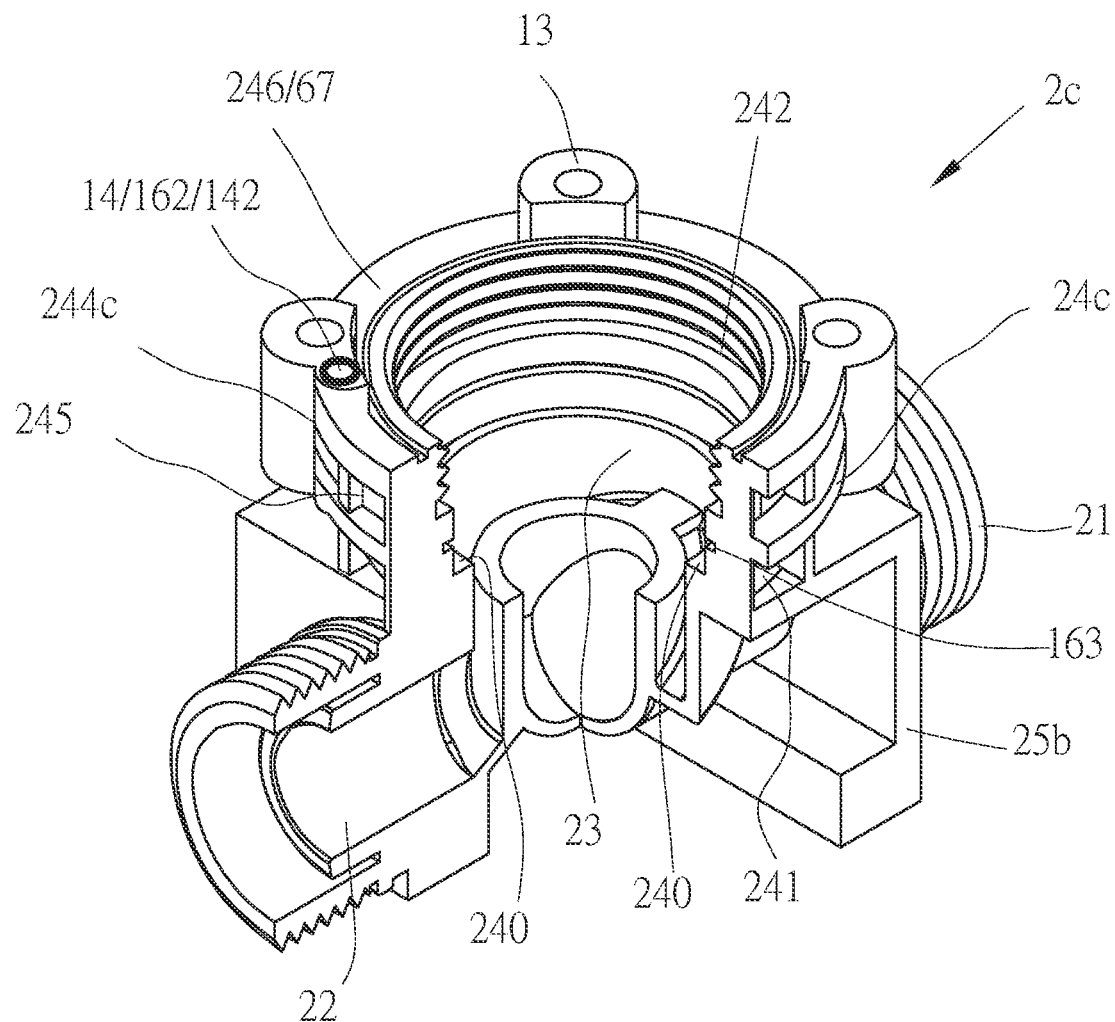
FIG. 7B is a schematic view of the valve body of the normally open pneumatic valve 1e for enhancing thermal isolation according to an embodiment of the present invention.
Figure 7C:
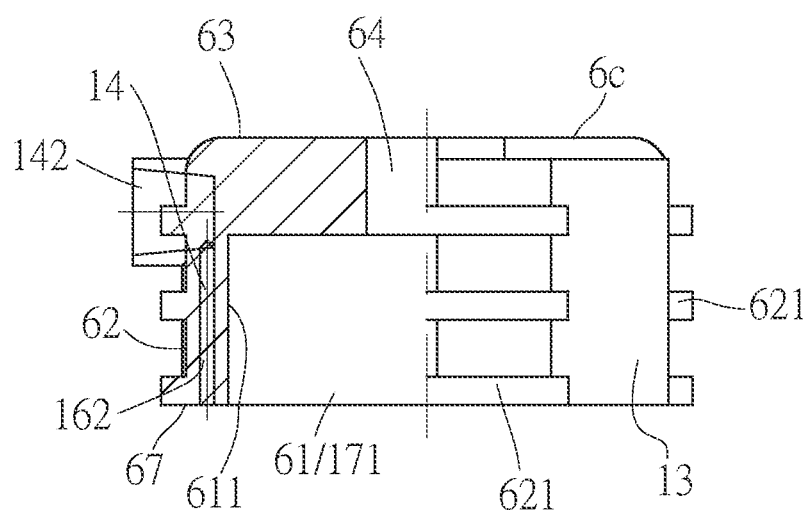
FIG. 7C is a schematic view of the valve upper cover of the normally open pneumatic valve 1e for enhancing thermal isolation according to an embodiment of the present invention.
Figure 7D:
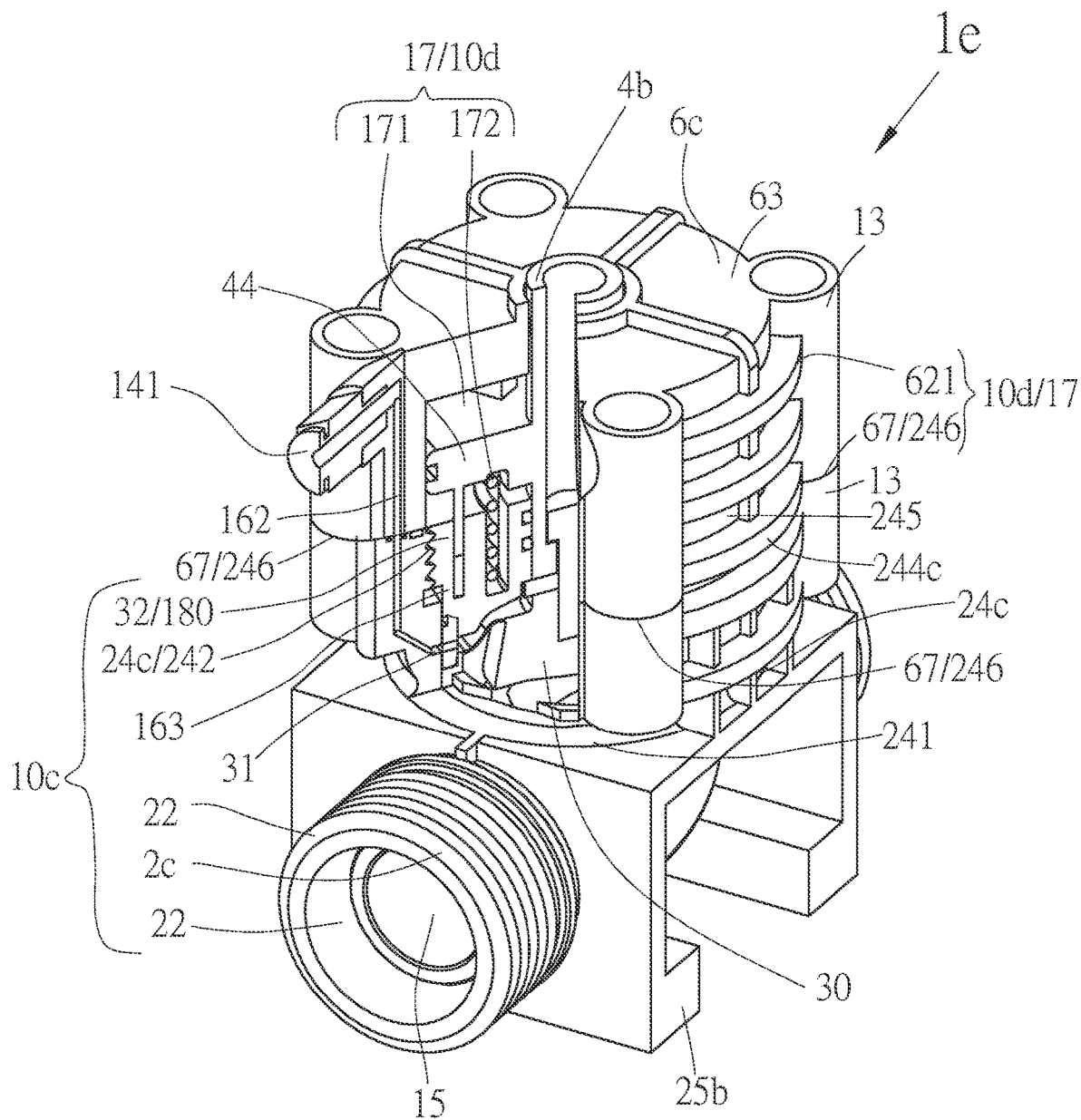
FIG. 7D is anisometric sectional view of the normally open pneumatic valve 1e for enhancing thermal isolation according to an embodiment of the present invention.

Referring to FIG. 7D, the driving cylinder 10d is a cylinder space 17 airtight from the upper valve body 32 to the valve upper cover 6c. The piston 44 of the valve shaft 4b divides the space into a gas space 171 and a spring space 172. A set of springs is installed in the upper spring space 172 to keep the diaphragm 30 normally open. The lower gas space 171 is introduced with high-pressure air to close the diaphragm 30.

The valve portion 10c includes a valve body 2c, the upper valve body 32, a diaphragm 30, the valve shaft 4b, and a tightening ring 31.

Referring to FIG. 7B and FIG. 7D, the valve body 2c further includes an annular portion 24c and a square portion 25b. The annular portion 24c further includes an internal screw thread 242, a ribbed plate structure 244c, a joint surface 246, four bolt posts 13, and a gas post 14. The annular portion 24c and the valve upper cover 6c are tightly locked with metal bolts passing through the bolt posts 13. The joint surface 246 and the joint surface 67 are tightly sealed. The bolt post 13 of the valve upper cover 6c has a bolt hole. The bolt post 13 of the annular portion 24c has a metal nut inside. A bolt passes through the bolt hole and locks the nut to achieve a tight seal.

Referring to FIG. 7C and FIG. 7D, the valve upper cover 6c further includes a plurality of annular ribbed plate 621, a plurality of the bolt posts 13, an internal ring surface 611, and a plurality of gas posts 14. The internal ring surface 611 serves as a sealing slide surface of the piston 44. The inside of the valve upper cover 6c is defined as the gas space 171. The annular ribbed plate 621 axially distributes the axial length of the valve upper cover, and also contains the axial length of the internal ring surface 611, and connects the bolt posts 13 and the gas posts 14. When high reliability is required in a high temperature environment, a plurality of annular ribbed plates 621 of the valve upper cover 6c are replaced by the ribbed plate structure 244c (not shown) to ensure the structural rigidity of the cylinder space 17.

Referring to FIG. 7D, the four corners of the valve upper cover 6c and the annular portion 24c have the bolt posts 13 respectively, and are installed above the minimum diameter area of the annular portion 24c and spaced apart from and located above the square portion 25b, that is, located above the heat source area 15 and the minimum diameter area 241, so as to prevent the thick structure of the bolt post 13 from becoming a large heat transfer area to cause a failure in thermal isolation. There is a seal between the joint surface 246 and the joint surface 67 to ensure that the metal bolt is not corroded.

The upper cover 6c has an inlet pipe communicating with a high-pressure driving gas. The driving gas passes through the gas space 171. The upper cover 6c has an inlet pipe communicating with a cooling gas and connected to the annular portion 24c via the gas post. The annular portion 24c is provided with a cooling gas hole for internal cooling. The cooling gas hole is disposed above the minimum diameter area 241 and is spaced apart from and located above the square portion 25b, that is, located above the heat transfer restriction area and the minimum diameter area 241, so as to prevent the thick structure from becoming a large heat transfer area to cause a failure in thermal isolation. Both the gas post 13 and the cooling gas hole 162 have an O-ring for airtightness.

Referring to FIG. 7D, the sealing mechanism 3b includes the annular portion 24c, the diaphragm 30, the tightening ring 31 and the upper valve body 32 and is located above the heat transfer restriction area. The ribbed plate structure 244c of the sealing mechanism 3b is composed of more than one annular ribbed plate and a plurality of vertical ribbed plates. The plurality of vertical ribbed plates are axially connected to all the annular ribbed plates through the square portion. The axial distribution position of the ribbed plate structure 244c contains the minimum diameter area 241 and the external ring surface 245, and also contains the axial length of the internal screw thread 242 in the axial position, and connects the bolt posts 13 and the gas posts 14. When the valve upper cover 6c is tightly locked, both the annular ribbed plate 621 and the sealing mechanism 3b increase the structural strength and heat dissipation effect of the cylinder space 17. Especially, when the ambient temperature is 100° C., the heat dissipation area is greatly increased.

Figure 8:
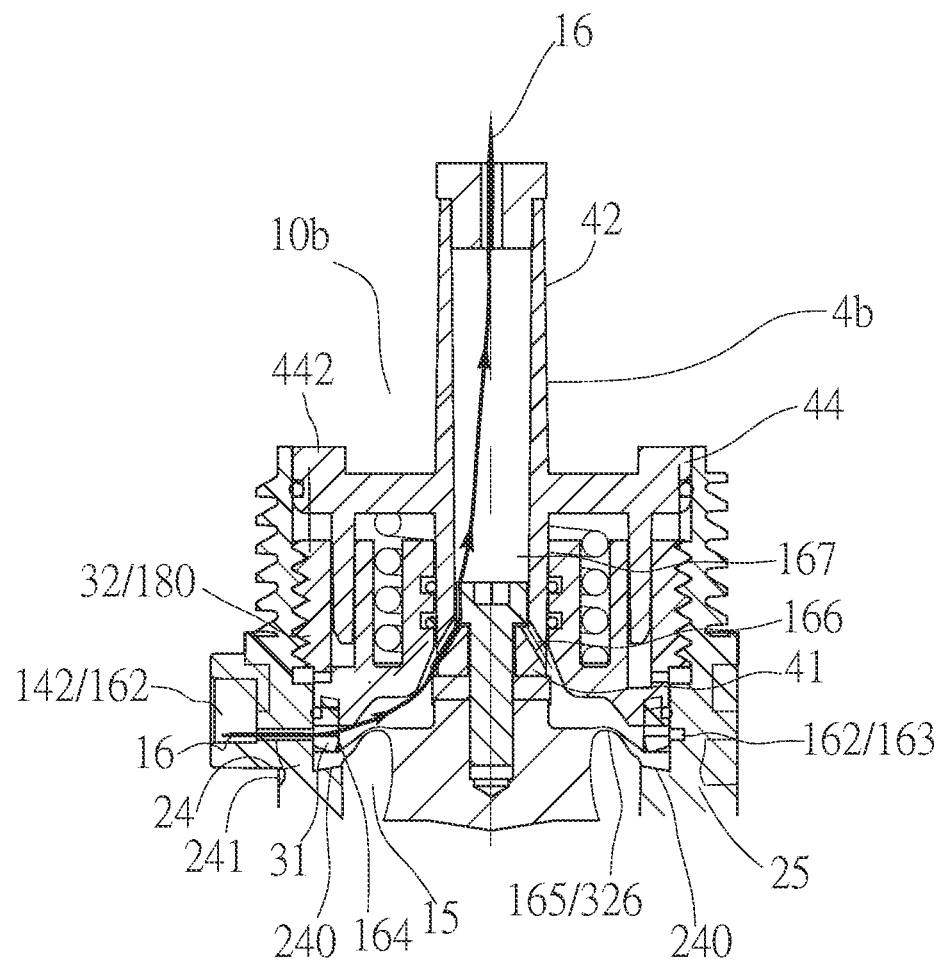
FIG. 8 is a schematic view of the cooling gas flow channel of the normally open pneumatic valve 1e for enhancing thermal isolation according to an embodiment of the present invention.
Figure 9:
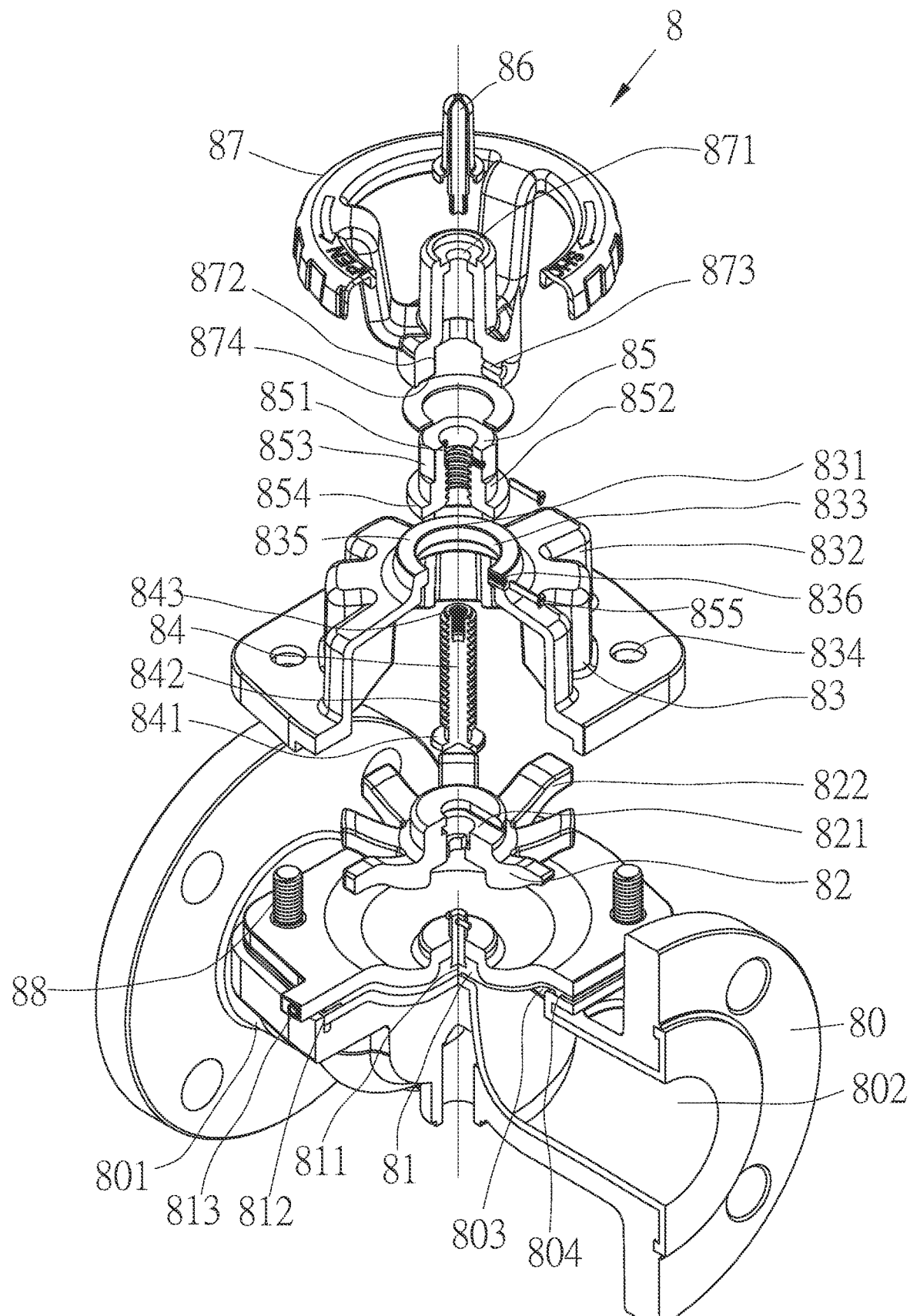
FIG. 9 is a schematic view of a conventional manual metal valve.

The sixth embodiment, referring to FIG. 8, illustrates the cooling gas flow channel 16. The external ring surface of the annular portion 24 is provided with one or more cooling gas holes 162 for introducing an external cooling gas through a pipe joint. The pipe joint is located above the minimum diameter area 241. The cooling gas flows through a cooling gas annular groove 163 provided on the inner side of the annular portion 24, a plurality of cooling gas guide holes 164 provided on the tightening ring 31, a diaphragm space 165 on a non-liquid contact side of the diaphragm chamber 326, and a plurality of vent holes 166 provided on the fixing end 41 of the valve shaft 4b to the shaft hole 167, and then the cooling gas is exhausted from the pipe joint or from the outlet of the shaft. The annular portion 24 is provided with a cooling gas hole to communicate with the external cooling gas. The cooling gas hole is disposed above the minimum diameter area 241 and is spaced apart from and located above the square portion 25, that is, located above the heat transfer restriction area and the heat source area 15, so as to prevent the thick structure from becoming a large heat transfer area to cause a failure in thermal isolation. The method to collect the vapor of the leaked liquid as a leakage warning (problem 9) is to connect a collection pipe detection system from the cooling gas hole 162 or connect a collection pipe from the tail end of the valve shaft 4 through the shaft hole 167 for detection.

What is claimed is:

1. A sealing mechanism of a fluororesin diaphragm valve, used for liquid transportation at 200° C. without forced cooling of an external gas and for liquid transportation at 230° C. with forced cooling of the external gas, the sealing mechanism of the fluororesin diaphragm valve comprising related parts and mechanisms of a valve portion;

the valve portion including a valve body, a force-applying member, a valve upper cover, a diaphragm, and a valve shaft; the valve body including an inlet, an outlet, a valve chamber, an annular portion, and a square portion;

the valve shaft being a hollow shaft, including a fixing end, a shaft rod, and a plurality of gas guide holes;

the annular portion being a cup-shaped structure having an opening, a bottom of the annular portion being defined as the valve chamber, the annular portion including a sealing surface, an external ring surface, a minimum diameter area, one or more cooling gas holes, a cooling gas annular groove and an internal ring surface, the opening being closed by the valve upper cover;

the valve upper cover including an inner accommodating chamber, an external ring surface, a top, and a central hole;

the diaphragm including a peripheral portion, an elastic portion, and a central portion:

one end of the valve shaft having a fixing end capable of locking the central portion of the diaphragm;

characterized in that:

the valve portion further includes a tightening ring; the annular portion further includes a ribbed plate structure;

the sealing mechanism includes the annular portion, the ribbed plate structure, the diaphragm, the tightening ring, and the force-applying member; the force-applying member has a tightening surface, and the tightening surface is a structural surface; the annular portion has the sealing surface, the sealing surface is a structural surface; the tightening surface connects the annular portion to the sealing surface to form a C-shaped structure; a tightening portion of the C-shaped structure includes the force-applying member, and the force-applying member is tightly locked to the annular portion; a support arm of the C-shaped structure provides overall structural strength for the annular portion and the ribbed plate structure; a base of the C-shaped structure is the sealing surface, which is supported by the minimum diameter area, a flow channel side wall of the valve chamber and the ribbed plate structure; the tightening surface is moved downward by locking tightly, so that the tightening ring and the diaphragm are clamped by the tightening surface and the sealing surface to prevent leakage;

the tightening ring is an annular structure with an approximately rectangular cross-section, and has two ends defined as a force-receiving end and a tightening end, and has a plurality of cooling gas holes; the tightening end is an obtuse angle $\beta$, $110° \le \beta \le 150°$;

when the diaphragm is installed in the valve chamber, the peripheral portion is attached to the sealing surface;

the tightening ring is installed in the tightening groove of the force-applying member; the tightening surface applies a force F to the force-receiving end, so that the tightening end having the obtuse angle β is tightened on the peripheral portion; when the sealing surface is applied with the force F, it is supported by the ribbed plate structure of the annular portion, and is supported by the square portion and the flow channel side wall of the valve chamber; the tightening force F has a force-applying angle ε with a normal line N of a force-applying surface of the peripheral portion, and the force-applying angle ε is in the range $0°<ε≤15°$.

2. The sealing mechanism of the fluororesin diaphragm valve as claimed in claim 1, wherein the ribbed plate structure is located on the external ring surface of the annular portion, and is an annular latticed structure with a plurality of horizontal openings; the ribbed plate structure is axially connected to the square portion, and its axial position contains the structure of the minimum diameter area, the tightening ring and the tightening surface; the ribbed plate structure is composed of one or more annular ribbed plates and a plurality of vertical ribbed plates, and the plurality of vertical ribbed plates are axially connected to all the annular ribbed plates through the square portion.

3. The sealing mechanism of the fluororesin diaphragm valve as claimed in claim 1, wherein the force-applying member is an upper valve body, the upper valve body includes a locking screw thread, a shaft hole, one or more annular grooves, a plurality of groove ribbed plates, a diaphragm chamber, and a tightening groove; the tightening groove has a tightening surface; the internal ring surface of the annular portion is provided with an internal screw thread, the locking screw thread is tightly engaged with the internal screw thread; the upper valve body is tightly locked to the internal screw thread, the tightening ring is installed in the tightening groove; and an axial distribution position of the ribbed plate structure contains the minimum diameter area and a plurality of screw threads of the external screw thread.

4. The sealing mechanism of the fluororesin diaphragm valve as claimed in claim 3, wherein the external ring surface of the annular portion is provided with an external screw thread, and a plurality of screw threads of the internal screw thread and the external screw thread are overlapped in the axial position, the ribbed plate structure connects the external screw thread, the valve upper cover is provided with an internal screw thread for tightly locking and engaging with the external screw thread of the annular portion; the axial position of the internal screw thread of the annular portion is contained by the axial length of the external screw thread and the ribbed plate structure; when the valve upper cover is tightly locked to the external screw thread, a plurality of screw threads distributed in the axial direction of the internal screw thread of the valve upper cover and the locking screw thread of the upper valve body are overlapped.

5. The sealing mechanism of the fluororesin diaphragm valve as claimed in claim 3, wherein the external ring surface of the annular portion is provided with a plurality of spaced annular ribbed plates, and the axial position of the ribbed plate structure contains the internal screw thread of the annular portion.

6. The sealing mechanism of the fluororesin diaphragm valve as claimed in claim 3, wherein an O-ring groove is provided on an exterior ring side of the force-receiving end.

7. The sealing mechanism of the fluororesin diaphragm valve as claimed in claim 3, wherein the valve shaft passes through the shaft hole of the upper valve body, the tightening ring is installed in the tightening groove, the diaphragm is installed on the fixing end of the valve shaft, and the diaphragm is rotatable relative to the valve shaft.

8. The sealing mechanism of the fluororesin diaphragm valve as claimed in claim 1, wherein the external ring surface of the valve upper cover is provided with a plurality of spaced annular ribbed plates.

9. The sealing mechanism of the fluororesin diaphragm valve as claimed in claim 1, wherein the external ring surface of the valve upper cover is provided with the ribbed plate structure.

10. The sealing mechanism of the fluororesin diaphragm valve as claimed in claim 1, wherein the exterior ring surface of the annular portion is provided with an external screw thread, the valve upper cover includes an inner accommodating chamber, an external ring surface, an internal screw thread, a top, a shaft hub portion, a central hole, and a sealing ribbed plate; the force-applying member is the sealing ribbed plate of the valve upper cover; the sealing ribbed plate is located between the shaft hub portion and the internal screw thread, a threaded groove is formed between the annular sealing ribbed plate and the internal screw thread, a shaft hub groove is formed between the shaft hub portion and the annular sealing ribbed plate; a lower end of the annular sealing ribbed plate is formed with an annular tightening groove, an opening of the groove faces the internal screw thread and faces downward, the tightening surface is provided at an upper bottom of the tightening groove; the tightening ring is installed in the annular tightening groove; a plurality of radial ribs are connected between the shaft hub portion and the annular sealing ribbed plate to provide higher rigidity of the sealing ribbed plate and to isolate heat transferred from the valve shaft; when the valve upper cover is tightly closed by the annular portion, the structure of the annular portion is embedded in the threaded groove, the exterior ring surface of the sealing ribbed plate is provided with a plurality of convex longitudinal ribs, and the plurality of convex longitudinal ribs are adjacent to the internal ring surface of the annular portion to provide structural rigidity and to isolate heat transferred from the peripheral portion of the diaphragm.

11. The sealing mechanism of the fluororesin diaphragm valve as claimed in claim 1, wherein the peripheral portion has a wedge-shaped cross-section, with a greater thickness on its outer side and a less thickness on its inner side connected to the elastic portion, the peripheral portion includes upper and lower side surfaces, the upper side surface is defined as a force-receiving surface, the lower side surface is defined as a fitting surface, the fitting surface and the force-receiving surface are mutually non-planar surfaces or conical surfaces, the fitting surface is attached to the sealing surface, the force-receiving surface is pressed tightly by the tightening end of the tightening ring.

12. The sealing mechanism of the fluororesin diaphragm valve as claimed in claim 1, wherein the sealing surface is a conical surface or a planar surface.

* * * * *